US012578848B2

(12) United States Patent
Anvaripour et al.

(10) Patent No.: US 12,578,848 B2
(45) Date of Patent: **\*Mar. 17, 2026**

(54) SELECTIVELY MODIFYING A GUI

(71) Applicant: Snap Inc., Santa Monica, CA (US)

(72) Inventors: Kaveh Anvaripour, Culver City, CA (US); Christie Marie Heikkinen, Sherman Oaks, CA (US); Ranidu Lankage, Belmont, CA (US); Jane Meng, Los Angeles, CA (US)

(73) Assignee: SNAP INC., Santa Monica, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/498,849

(22) Filed: Oct. 31, 2023

(65) Prior Publication Data

US 2024/0160343 A1 May 16, 2024

Related U.S. Application Data

(60) Provisional application No. 63/425,407, filed on Nov. 15, 2022.

(51) Int. Cl.
 *G06F 3/04845* (2022.01)
 *G06F 3/04815* (2022.01)
 (Continued)

(52) U.S. Cl.
 CPC ...... *G06F 3/04845* (2013.01); *G06F 3/04815* (2013.01); *G06F 3/0482* (2013.01);
 (Continued)

(58) Field of Classification Search
 None
 See application file for complete search history.

(56) References Cited

U.S. PATENT DOCUMENTS 6,061,056 A \* 5/2000 Menard .............. H04N 21/4826
715/704
8,610,673 B2 \* 12/2013 Storrusten ............. G06F 3/0482
345/173
(Continued)

FOREIGN PATENT DOCUMENTS

WO 2019217003 11/2019
WO WO-2024107705 A1 5/2024
WO WO-2024107720 A1 5/2024

OTHER PUBLICATIONS

"International Application Serial No. PCT/US2023/079608, International Search Report mailed Feb. 20, 2024", 3 pgs.
(Continued)

*Primary Examiner* — An Son P Huynh
(74) *Attorney, Agent, or Firm* — SCHWEGMAN LUNDBERG & WOESSNER, P.A.

(57) ABSTRACT

Aspects of the present disclosure involve a system and a method for navigating images and AR experiences. The system and method present, by a messaging application, in a scrollable region on top of a live video feed being displayed in a GUI comprising a viewfinder, a first plurality of options associated with previously captured content items and a second plurality of options associated with AR experiences. The system and method scrolls the first plurality of options together with the second plurality of options of the scrollable region to bring one of the first plurality of options or one of the second plurality of options into focus. In response, the system and method: modify a configuration of the GUI in accordance with a first manner or modify the configuration of the GUI in accordance with a second manner.

20 Claims, 15 Drawing Sheets

(51) Int. Cl.
*G06F 3/0482* (2013.01)
*G06F 3/0485* (2022.01)
*G06F 3/0488* (2022.01)
*H04L 51/04* (2022.01)

(52) U.S. Cl.
CPC .......... *G06F 3/0485* (2013.01); *G06F 3/0488*
(2013.01); *H04L 51/04* (2013.01)

(56) References Cited

U.S. PATENT DOCUMENTS

| | | | | |
|---|---|---|---|---|
| 10,070,192 | B2 * | 9/2018 | Baratz ................ | H04N 21/4788 |
| 10,187,690 | B1 * | 1/2019 | Garcia ............ | H04N 21/44226 |
| 10,339,721 | B1 * | 7/2019 | Dascola .................. | G06F 3/011 |
| 10,440,436 | B1 * | 10/2019 | Taylor .................. | H04N 21/812 |
| 10,943,125 | B1 * | 3/2021 | Evans ................ | H04N 21/4788 |
| 11,056,014 | B1 * | 7/2021 | Chasen .................... | G09B 7/00 |
| 11,082,467 | B1 * | 8/2021 | Hartnett ................ | H04L 65/403 |
| 11,432,047 | B1 * | 8/2022 | Panchaksharaiah .. | H04L 51/046 |
| 11,758,238 | B2 * | 9/2023 | Davies ................ | H04N 21/854 |
| | | | | 725/32 |
| 11,909,921 | B1 * | 2/2024 | Paul ...................... | H04M 3/567 |
| 12,063,423 | B1 * | 8/2024 | Neuweg ............ | H04N 21/8541 |
| 12,200,320 | B2 * | 1/2025 | Yoshida ............ | H04N 21/2402 |
| 2002/0174430 | A1 * | 11/2002 | Ellis .................. | H04N 21/4753 |
| | | | | 386/230 |
| 2010/0017474 | A1 * | 1/2010 | Kandekar .......... | H04N 21/4312 |
| | | | | 709/205 |
| 2010/0153885 | A1 * | 6/2010 | Yates .................. | G06F 16/7867 |
| | | | | 707/723 |
| 2011/0249074 | A1 * | 10/2011 | Cranfill ................. | G06F 3/0486 |
| | | | | 348/E7.083 |
| 2012/0311635 | A1 * | 12/2012 | Mushkatblat ........ | H04N 21/485 |
| | | | | 725/43 |
| 2013/0113827 | A1 * | 5/2013 | Forutanpour ......... | G06T 3/4038 |
| | | | | 345/633 |
| 2014/0365882 | A1 * | 12/2014 | Lemay .................... | G06F 3/016 |
| | | | | 715/256 |
| 2015/0016801 | A1 * | 1/2015 | Homma .................. | G11B 27/19 |
| | | | | 386/243 |
| 2015/0153910 | A1 * | 6/2015 | Wheeler ............... | G06F 3/0485 |
| | | | | 715/837 |
| 2016/0054791 | A1 * | 2/2016 | Mullins .................. | G04G 21/04 |
| | | | | 345/173 |
| 2017/0006322 | A1 * | 1/2017 | Dury .................... | H04N 21/254 |
| 2017/0357382 | A1 * | 12/2017 | Miura .................. | G06F 3/04842 |
| 2018/0027298 | A1 * | 1/2018 | Paglia .................. | H04N 21/234 |
| | | | | 725/37 |
| 2018/0095636 | A1 * | 4/2018 | Valdivia .................. | G06F 3/011 |
| 2018/0192000 | A1 * | 7/2018 | Mercredi ............... | G06Q 50/01 |
| 2018/0199110 | A1 * | 7/2018 | Cormican .......... | H04N 21/4722 |
| 2018/0234738 | A1 * | 8/2018 | Sarkar ................ | H04N 21/2541 |
| 2018/0335927 | A1 * | 11/2018 | Anzures ............... | G06V 40/176 |
| 2018/0376205 | A1 * | 12/2018 | Oswal .................. | G06T 19/006 |
| 2019/0132650 | A1 * | 5/2019 | Kedenburg, III .. | H04N 21/4223 |
| 2019/0179405 | A1 * | 6/2019 | Sun ........................ | G06F 1/1686 |
| 2019/0339831 | A1 * | 11/2019 | Kobayashi ............ | G11B 27/00 |
| 2019/0342507 | A1 * | 11/2019 | Dye ........................ | G06T 13/40 |
| 2019/0349619 | A1 * | 11/2019 | Hou .......................... | G06N 3/08 |
| 2019/0362312 | A1 * | 11/2019 | Platt ........................ | G06F 3/011 |
| 2020/0014961 | A1 * | 1/2020 | Ramaswamy ............................... | |
| | | | | H04N 21/234345 |
| 2020/0082599 | A1 * | 3/2020 | Manzari .................... | G06T 7/50 |
| 2020/0356593 | A1 * | 11/2020 | Azzinnari ............... | G06F 16/64 |
| 2020/0382681 | A1 * | 12/2020 | Smithwick .......... | H04N 9/3194 |
| 2020/0382845 | A1 * | 12/2020 | Payne .............. | H04N 21/44204 |
| 2020/0396497 | A1 * | 12/2020 | Liu .................... | H04N 21/4826 |
| 2021/0006867 | A1 * | 1/2021 | Liu .................... | H04N 21/4316 |
| 2021/0035559 | A1 * | 2/2021 | Xu .......................... | G10L 15/063 |
| 2021/0065454 | A1 * | 3/2021 | Goodrich .............. | G06N 20/00 |
| 2021/0067756 | A1 * | 3/2021 | Goodrich .............. | H04L 67/131 |
| 2021/0081093 | A1 * | 3/2021 | Yun ........................ | G06F 3/0484 |
| 2021/0105538 | A1 * | 4/2021 | Ogawa .............. | H04N 21/8456 |
| 2021/0185386 | A1 * | 6/2021 | Kong .............. | H04N 21/4394 |
| 2021/0258643 | A1 * | 8/2021 | Park .................. | H04N 21/4756 |
| 2021/0266641 | A1 * | 8/2021 | Selfors .............. | H04N 21/4856 |
| 2022/0021950 | A1 * | 1/2022 | Wei .................. | H04N 21/44016 |
| 2022/0046302 | A1 * | 2/2022 | Shanson ............. | H04N 21/251 |
| 2022/0101355 | A1 * | 3/2022 | Luo .................... | G06Q 30/0202 |
| 2022/0103873 | A1 * | 3/2022 | Yoshida .............. | H04N 21/242 |
| 2022/0167036 | A1 * | 5/2022 | Lin .................. | H04N 21/25866 |
| 2022/0179665 | A1 * | 6/2022 | Rathod .................. | G06F 9/451 |
| 2022/0233956 | A1 * | 7/2022 | Fukushige ............ | A63F 13/525 |
| 2022/0239988 | A1 * | 7/2022 | Yang .................. | H04N 21/4725 |
| 2022/0295040 | A1 * | 9/2022 | Jayaram .................... | G06T 7/73 |
| 2022/0323862 | A1 * | 10/2022 | Baba ...................... | G06F 3/013 |
| 2022/0358729 | A1 * | 11/2022 | Hong .................... | G10L 15/22 |
| 2023/0171456 | A1 * | 6/2023 | Sharma .................... | G06F 3/14 |
| | | | | 725/38 |
| 2023/0318997 | A1 * | 10/2023 | Rathod ................ | H04N 21/254 |
| | | | | 709/203 |
| 2023/0326115 | A1 * | 10/2023 | Xiao .................. | H04N 21/4884 |
| | | | | 345/473 |
| 2024/0163489 | A1 | 5/2024 | Anvaripour et al. | |

OTHER PUBLICATIONS

"International Application Serial No. PCT/US2023/079608, Written Opinion mailed Feb. 20, 2024", 6 pgs.
"International Application Serial No. PCT/US2023/079631, International Search Report mailed Feb. 23, 2024", 4 pgs.
"International Application Serial No. PCT/US2023/079631, Written Opinion mailed Feb. 23, 2024", 7 pgs.
"U.S. Appl. No. 18/496,749, Examiner Interview Summary mailed May 1, 2025", 2 pgs.
"U.S. Appl. No. 18/496,749, Non Final Office Action mailed Mar. 5, 2025", 22 pgs.
"U.S. Appl. No. 18/496,749, Final Office Action mailed May 28, 2025", 29 pgs.
"U.S. Appl. No. 18/496,749, Response filed May 13, 2025 to Non Final Office Action mailed Mar. 5, 2025", 12 pgs.
"International Application Serial No. PCT/US2023/079608, International Preliminary Report on Patentability mailed May 22, 2025", 9 pgs.
"International Application Serial No. PCT/US2023/079631, International Preliminary Report on Patentability mailed—May 22, 2025", 9 pgs.

* cited by examiner

104

114

~100

MESSAGING CLIENT

APPLICATION SERVERS

202 — EPHEMERAL TIMER SYSTEM

204 — COLLECTION MANAGEMENT SYSTEM    CURATION INTERFACE

206

208 — AUGMENTATION SYSTEM

210 — MAP SYSTEM

212 — GAME SYSTEM

220 — EXTERNAL RESOURCE SYSTEM

224 — CONTENT AND AR EXPERIENCE ACCESS SYSTEM

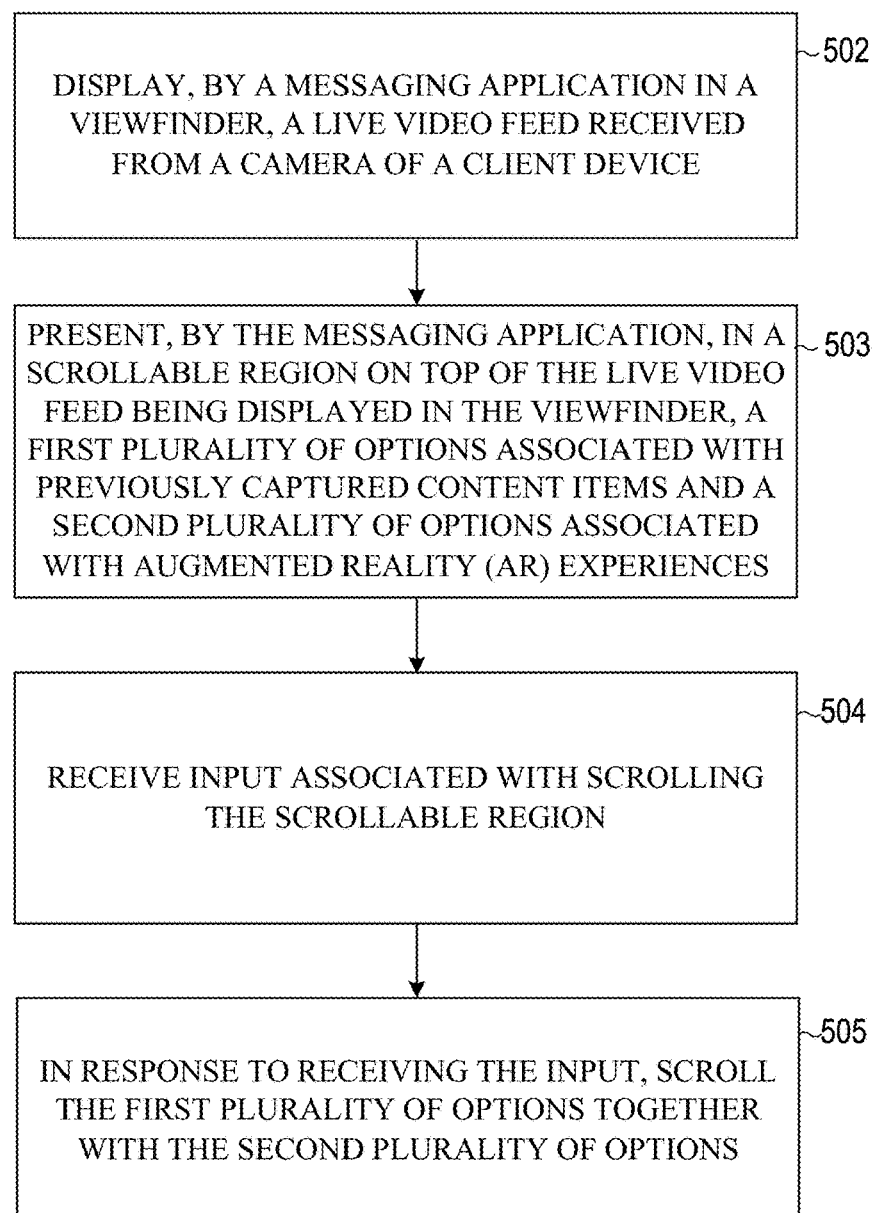

500

DISPLAY, BY A MESSAGING APPLICATION IN A VIEWFINDER, A LIVE VIDEO FEED RECEIVED FROM A CAMERA OF A CLIENT DEVICE ~502

PRESENT, BY THE MESSAGING APPLICATION, IN A SCROLLABLE REGION ON TOP OF THE LIVE VIDEO FEED BEING DISPLAYED IN THE VIEWFINDER, A FIRST PLURALITY OF OPTIONS ASSOCIATED WITH PREVIOUSLY CAPTURED CONTENT ITEMS AND A SECOND PLURALITY OF OPTIONS ASSOCIATED WITH AUGMENTED REALITY (AR) EXPERIENCES ~503

RECEIVE INPUT ASSOCIATED WITH SCROLLING THE SCROLLABLE REGION ~504

IN RESPONSE TO RECEIVING THE INPUT, SCROLL THE FIRST PLURALITY OF OPTIONS TOGETHER WITH THE SECOND PLURALITY OF OPTIONS ~505

Figure 5B:
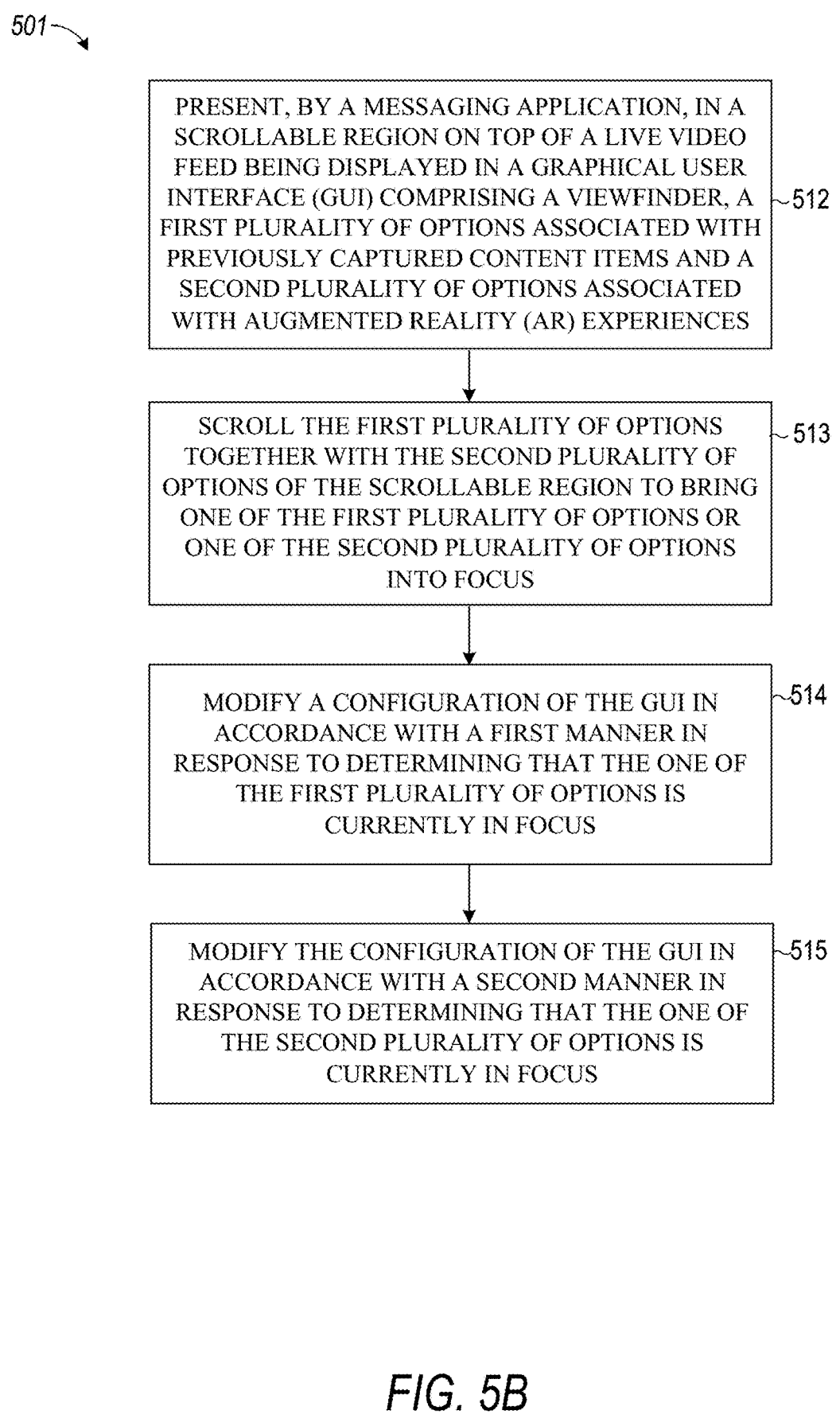

PRESENT, BY A MESSAGING APPLICATION, IN A SCROLLABLE REGION ON TOP OF A LIVE VIDEO FEED BEING DISPLAYED IN A GRAPHICAL USER INTERFACE (GUI) COMPRISING A VIEWFINDER, A FIRST PLURALITY OF OPTIONS ASSOCIATED WITH PREVIOUSLY CAPTURED CONTENT ITEMS AND A SECOND PLURALITY OF OPTIONS ASSOCIATED WITH AUGMENTED REALITY (AR) EXPERIENCES    ~512

SCROLL THE FIRST PLURALITY OF OPTIONS TOGETHER WITH THE SECOND PLURALITY OF OPTIONS OF THE SCROLLABLE REGION TO BRING ONE OF THE FIRST PLURALITY OF OPTIONS OR ONE OF THE SECOND PLURALITY OF OPTIONS INTO FOCUS    ~513

MODIFY A CONFIGURATION OF THE GUI IN ACCORDANCE WITH A FIRST MANNER IN RESPONSE TO DETERMINING THAT THE ONE OF THE FIRST PLURALITY OF OPTIONS IS CURRENTLY IN FOCUS    ~514

MODIFY THE CONFIGURATION OF THE GUI IN ACCORDANCE WITH A SECOND MANNER IN RESPONSE TO DETERMINING THAT THE ONE OF THE SECOND PLURALITY OF OPTIONS IS CURRENTLY IN FOCUS    ~515

SELECTIVELY MODIFYING A GUI

CLAIM OF PRIORITY

This application claims the benefit of priority to U.S. Provisional Application Ser. No. 63/425,407, filed Nov. 15, 2022, which is incorporated herein by reference in its entirety.

TECHNICAL FIELD

The present disclosure relates generally to navigating through menu items.

BACKGROUND

Social network sites are some of the most, if not the most, popularly visited sites on the Internet. Social networks provide a vast amount of information about users and their friends. Such information includes current status of users and their interests. Social network sites provide users with access to previously captured images and videos and the ability to launch one or more augmented reality (AR) or virtual reality (VR) experiences.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIGS. 5A and 5B are illustrations of example operations performed by the content and AR experience access system, according to some examples.

DETAILED DESCRIPTION

Figure 1:
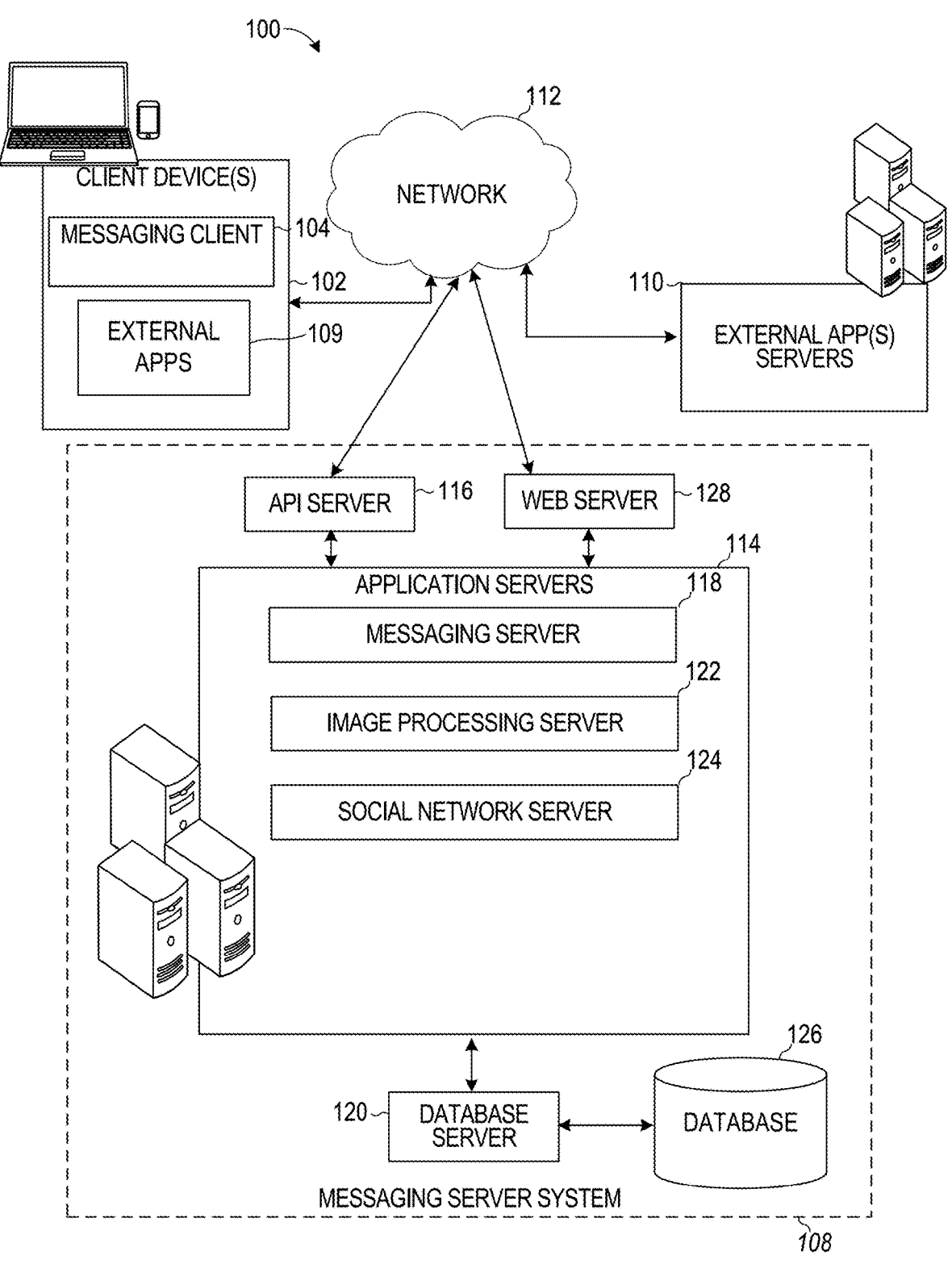
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical systems allow users to share various content items with other users and also provide the ability to apply various AR/VR experiences to the content items. To do so, the typical systems provide a search interface or graphical user interface (GUI) specific to the previously captured content items for the user to navigate through and select a given content item of interest. To find the given content item of interest, users typically need to navigate through multiple pages of information, which can take a great deal of time. Once the given content item is selected, the typical systems allow users to launch a separate editing interface to modify the given content item, such as by applying one or more AR/VR experiences to the given content item. Finding a desired AR/VR experience can further take a great deal of time as the user again has to navigate through multiple pages of information to find an AR/VR experience to apply.

When the user is satisfied with the selected content item and modifications applied to the content item, the user can access a sharing GUI to select one or more recipients of the modified content item. The need to manually navigate through multiple pages of information, makes such systems less attractive and less intuitive to use, which increases their overall complexity and reduces their overall efficiency. Navigating through a multitude of screens and pages of information to send a particular content item of interest on resource-constrained devices, such as mobile devices, consumes a great deal of resources, processing power and battery, which reduces the overall functionality and efficiency of operating such devices.

The disclosed embodiments improve the efficiency of using the electronic device by enabling users to quickly and easily navigate a GUI that includes a single scrollable region that includes both content items that have been previously captured and AR/VR experiences. From the same GUI, the user can select a content item of interest, a modification to apply to the content item of interest, and one or more recipients to whom to send the modified content item of interest. This expedites the manner in which content is shared between users and makes such a system more efficient to operate in mobile settings and environments, especially by reducing the number of pages of information a user needs to search through and access to share a particular content item. This provides such users unique ways to select and create content items to share in unique environments and situations, which increases the overall appeal and enjoyment of the system.

The disclosed techniques display, by a messaging application in a viewfinder, a live video feed received from a camera of a client device. The disclosed techniques present, by the messaging application, in a scrollable region on top of the live video feed displayed in the viewfinder, a first plurality of options associated with previously captured content items and a second plurality of options associated with AR experiences. The disclosed techniques receive input associated with scrolling the scrollable region and, in response to the input, scroll the first plurality of options together with the second plurality of options to allow a user to select an item of interest.

In some examples, the disclosed techniques present, by a messaging application, in a scrollable region on top of a live video feed displayed in a GUI including a viewfinder, a first plurality of options associated with previously captured content items and a second plurality of options associated with AR experiences. The disclosed techniques scroll the first plurality of options together with the second plurality of options of the scrollable region to bring one of the first plurality of options or one of the second plurality of options into focus. The disclosed techniques, in response to scrolling the first plurality of options together with the second plurality of options of the scrollable region, modify a configuration of the GUI in accordance with a first manner in response to determining that the one of the first plurality of options is currently in focus. The disclosed techniques, in response to scrolling the first plurality of options together with the second plurality of options of the scrollable region, modify the configuration of the GUI in accordance with a second manner in response to determining that the one of the second plurality of options is currently in focus.

This way, users do not need to navigate through a multitude of different pages of information to share and create content items. This improves the overall efficiencies of the computing device and reduces complexities in using the messaging application.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications (also referred to as "external applications" and "external apps") 109 using Application Program Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
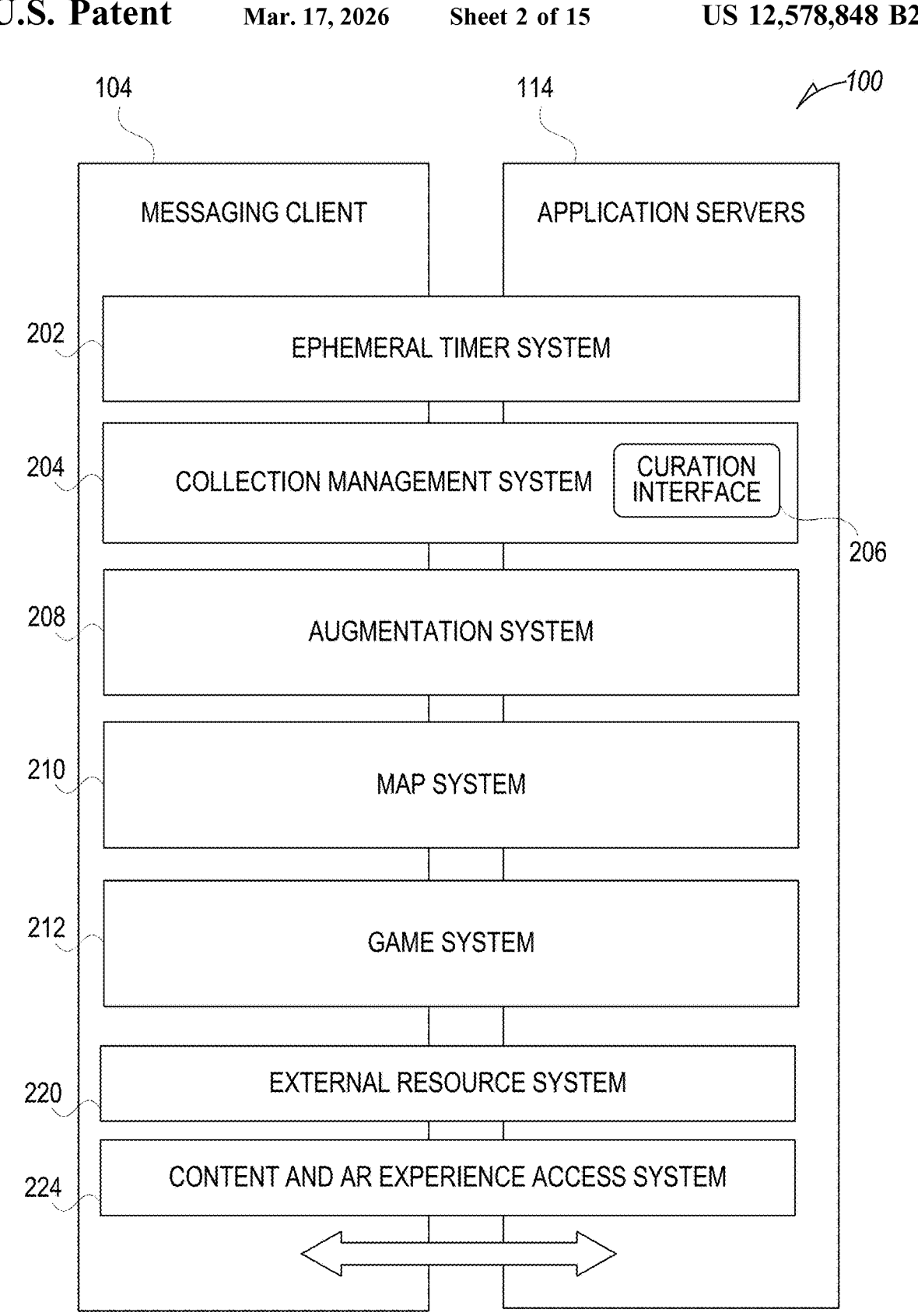
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification.

Figure 3:
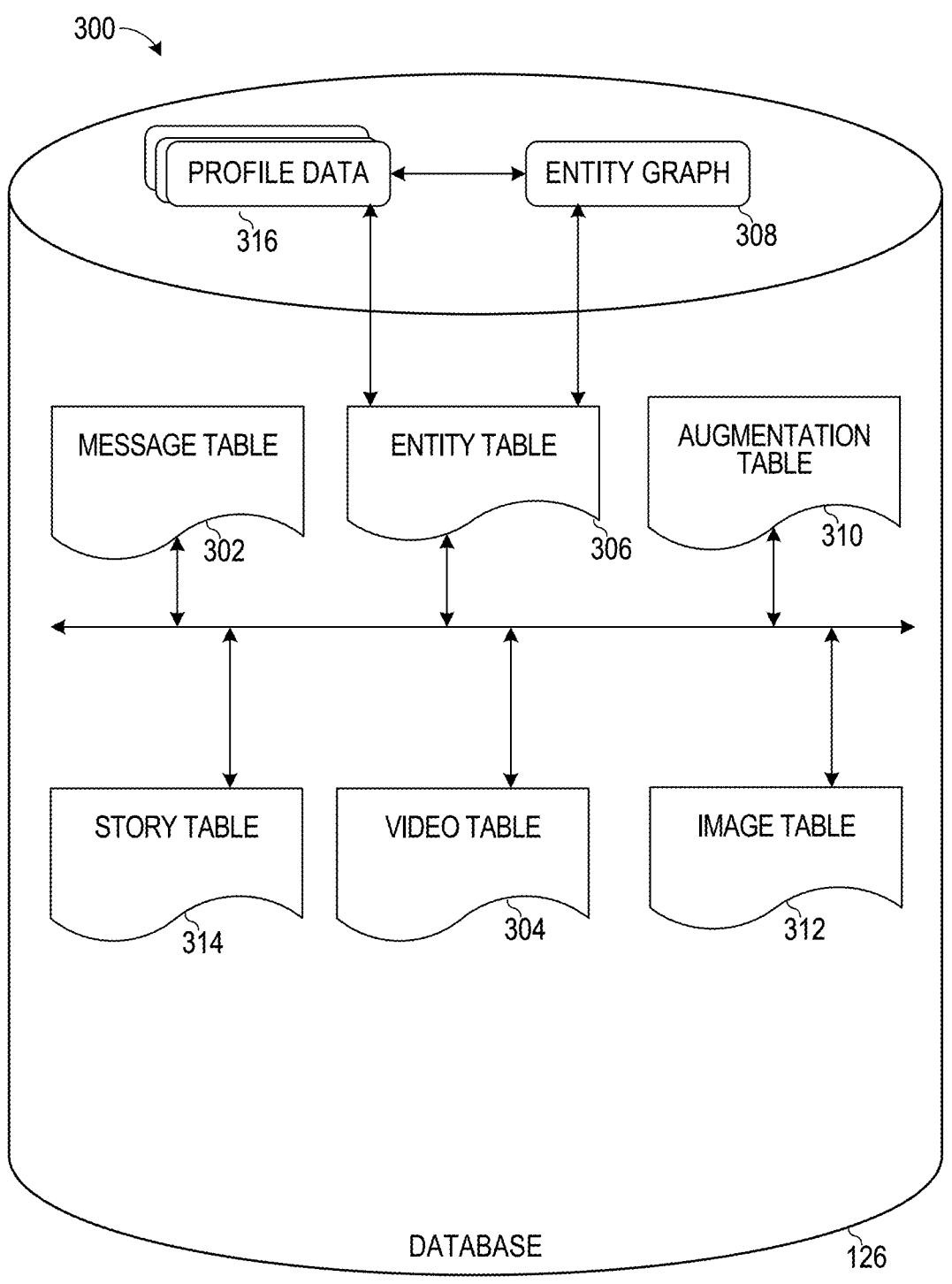
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 also includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

A content and AR experience access system 224 allows a user to navigate through previously captured content items and AR experiences quickly and easily (or other applications, such as external apps) through a single scrollable region or scroll bar. The content and AR experience access system 224 presents a scrollable region concurrently with and/or on top of a real-time video feed being received from a camera of the client device 102. The scrollable region includes a first plurality of icons or options for accessing previously captured content items (e.g., images and/or videos captured by the client device 102 and/or received from another user). The scrollable region includes a second plurality of icons or options for accessing different AR experiences. The first and second plurality of icons or options are divided visibly by an indicator that corresponds to the real-time video feed. The first plurality of icons can be visually distinguished from the second plurality of icons, such as by using a first geometric shape (e.g., square, rectangle, circle, or triangle) and/or color for each of the first plurality of icons and using a second geometric shape (e.g., square, rectangle, circle, or triangle) and/or color for each of the second plurality of icons.

The content and AR experience access system 224 also presents, separately from the scrollable region, a first icon or option for accessing a full library or list of all available previously captured content items and a second icon or option for searching all of the available AR experiences. Namely, the scrollable region can only include or represent a subset of all the available previously captured content items using the first plurality of icons or options. The subset can be selected based on time of day, location, and/or content item type. To view the complete list of previously captured content items, a user can select the first icon or option. Similarly, the scrollable region can only include or represent a subset of all the available AR experiences using the second plurality of icons or options. The subset of AR experiences can be selected based on time of day, location, and/or AR experience type. To view the complete list of AR experiences, a user can select the second icon or option.

The content and AR experience access system 224 receives input from a user, such a swipe gesture in a first direction (e.g., left direction) and, in response, the content and AR experience access system 224 navigates or scrolls and animates the scrollable region as scrolling in the first direction. The scrollable region includes a focus or center portion in which different ones of the first/second plurality of icons are positioned and displayed as the scrollable region is being scrolled. As each icon is focused on in the center portion or focus region, the corresponding content item and/or AR experience is accessed. If the icon in focus corresponds to a previously captured content item, the content and AR experience access system 224 presents the corresponding previously captured content item in the viewfinder in which the real-time video feed was presented replacing the real-time video feed. If the icon in focus corresponds to an AR experience, the content and AR experience access system 224 presents one or more options for launching the AR experience in relation to the real-time video feed presented in the viewfinder and/or in relation to a previously captured content item.

In some examples, the content and AR experience access system 224 conditionally modifies a configuration of the GUI in which the scrollable region and the real-time video feed are presented. The conditions can be based on many different factors and criteria, such as which icon is currently in focus. Namely, the content and AR experience access system 224 modifies a configuration of the GUI in accordance with a first manner in response to determining that the one of the first plurality of options is currently in focus. The content and AR experience access system 224 modifies the configuration of the GUI in accordance with a second manner in response to determining that the one of the second plurality of options is currently in focus.

In some examples, the content and AR experience access system 224 displays, by a messaging application in a viewfinder, a live video feed received from a camera of a client device. The content and AR experience access system 224 presents, by the messaging application, in a scrollable region on top of the live video feed displayed in the viewfinder, a first plurality of options associated with previously captured content items and a second plurality of options associated with AR experiences and receives input associated with scrolling the scrollable region. The content and AR experience access system 224, in response to receiving the input, scrolls the first plurality of options together with the second plurality of options.

In some examples, the content and AR experience access system 224 presents an indicator of the live video feed within the scrollable region between the first plurality of options and the second plurality of options. In some aspects, each of the first plurality of options is represented by a first type of visual indicator, and each of the second plurality of options is represented by a second type of visual indicator. In some aspects, the previously captured content items include at least one of a previously captured image or a previously captured video.

In some aspects, the previously captured content items associated with the first plurality of options correspond to a subset of a plurality of content items previously stored by the client device. In such cases, the content and AR experience access system 224 presents an option for accessing the plurality of content items on top of the live video feed being displayed in the viewfinder and separately from the scrollable region.

In some aspects, the content and AR experience access system 224 selects the subset of the plurality of content items from the plurality of content items previously stored by the client device based on one or more criteria. The one or more criteria include time associated with each of the subset of the plurality of content items, location associated with each of the subset of the plurality of content items, and/or content item type associated with each of the subset of the plurality of content items.

In some examples, the AR experiences associated with the second plurality of options correspond to a subset of a plurality of AR experiences available on the messaging application. In such cases, the content and AR experience access system 224 presents an option for searching the plurality of AR experiences on top of the live video feed being displayed in the viewfinder and separately from the scrollable region. In some aspects, the option for searching the plurality of AR experiences includes a first option. The content and AR experience access system 224 presents a second option for accessing a plurality of content items on top of the live video feed being displayed in the viewfinder and separately from the scrollable region.

In some examples, the input includes a swipe gesture in a first direction on top of the scrollable region. The content and AR experience access system 224 scrolls the first plurality of options together with the second plurality of options along the first direction in response to the swipe gesture. In some aspects, the content and AR experience access system 224 identifies an individual option of the first plurality of options that is currently in focus based on scrolling the first plurality of options together with the second plurality of options. The content and AR experience access system 224 replaces display of the live video feed in the viewfinder with display of an individual previously captured content item associated with the individual option of the first plurality of options that is currently in focus. The content and AR experience access system 224 presents a navigation region associated with the individual previously captured content item in response to identifying the individual option of the first plurality of options that is currently in focus, the navigation region including one or more options associated with the individual previously captured content item.

In some examples, the one or more options include an editing option for modifying the individual previously captured content item, a category-based search option, and/or a content sharing option for sending the individual previously captured content item to one or more other users. In some aspects, the content and AR experience access system 224, as different ones of the previously captured content items associated with the first plurality of options is brought into focus based on scrolling the first plurality of options together with the second plurality of options, updates display of the live video feed in the viewfinder with display of the different ones of the previously captured content items. In some aspects, the content and AR experience access system 224 presents a first of the previously captured content items in the viewfinder in a first aspect ratio associated with the first of the previously captured content items. After the first of the previously captured content items is presented, the content and AR experience access system 224 presents a second of the previously captured content items in the viewfinder in a second aspect ratio associated with the second of the previously captured content items.

In some examples, the input includes a swipe gesture in a second direction on top of the scrollable region. In such cases, the content and AR experience access system 224 scrolls the first plurality of options together with the second plurality of options along the second direction in response to the swipe gesture. In some examples, the content and AR experience access system 224 identifies an individual option of the second plurality of options that is currently in focus based on scrolling the first plurality of options together with the second plurality of options. The content and AR experience access system 224 applies, to the live video feed in the viewfinder, an individual AR experience associated with the individual option of the second plurality of options that is currently in focus. The content and AR experience access system 224 presents a navigation region associated with the individual AR experience in response to identifying the individual option of the second plurality of options that is currently in focus, the navigation region including one or more options associated with the individual AR experience.

In some examples, the one or more options include an option to modify an attribute of the individual AR experience, an option to activate the individual AR experience, and/or an option to save the individual AR experience. In some aspects, the content and AR experience access system 224 receives a swipe gesture in a second direction and determines that a rate at which the swipe gesture in the second direction is performed transgresses a reference rate. The content and AR experience access system 224, in response to determining that the rate at which the swipe gesture in the second direction is performed transgresses the reference rate, scrolls the first plurality of options together with the second plurality of options along the second direction up to a predetermined termination point that is between a first option of the first plurality of options and a first option of the second plurality of options. In some aspects, the predetermined termination point corresponds to an indicator of the live video feed displayed within the scrollable region between the first plurality of options and the second plurality of options.

In some examples, the content and AR experience access system 224 presents, by a messaging application, in a scrollable region on top of a live video feed being displayed in a GUI including a viewfinder, a first plurality of options associated with previously captured content items and a second plurality of options associated with AR experiences. The content and AR experience access system 224 scrolls the first plurality of options together with the second plurality of options of the scrollable region to bring one of the first plurality of options or one of the second plurality of options into focus. The content and AR experience access system 224, in response to scrolling the first plurality of options together with the second plurality of options of the scrollable region, modifies a configuration of the GUI in accordance with a first manner in response to determining that the one of the first plurality of options is currently in focus and modifies the configuration of the GUI in accordance with a second manner in response to determining that the one of the second plurality of options is currently in focus.

In some examples, the content and AR experience access system 224 presents an indicator of the live video feed within the scrollable region between the first plurality of options and the second plurality of options. In some examples, each of the first plurality of options is represented by a first type of visual indicator, and each of the second plurality of options is represented by a second type of visual indicator. In some examples, the previously captured content items include at least one of a previously captured image or a previously captured video. In some examples, the previously captured content items associated with the first plurality of options correspond to a subset of a plurality of content items previously stored by a client device. In such cases, the content and AR experience access system 224 presents an option for accessing the plurality of content items on top of the live video feed being displayed in the GUI and separately from the scrollable region.

In some examples, the content and AR experience access system 224 selects the subset of the plurality of content items from the plurality of content items previously stored by the client device based on one or more criteria, the one or more criteria including time associated with each of the subset of the plurality of content items, location associated with each of the subset of the plurality of content items, and/or content item type associated with each of the subset of the plurality of content items. In some aspects, the AR experiences associated with the second plurality of options correspond to a subset of a plurality of AR experiences available on the messaging application. The content and AR experience access system 224 presents an option for searching the plurality of AR experiences on top of the live video feed being displayed in the GUI and separately from the scrollable region.

In some examples, the option for searching the plurality of AR experiences includes a first option and the content and AR experience access system 224 presents a second option for accessing a plurality of content items on top of the live video feed being displayed in the GUI and separately from the scrollable region. In some aspects, the content and AR experience access system 224 receives input including a swipe gesture in a given direction, wherein the first plurality of options are scrolled together with the second plurality of options along the given direction in response to the swipe gesture.

In some examples, the content and AR experience access system 224 receives a swipe gesture in a second direction and determines that a rate at which the swipe gesture in the second direction is performed transgresses a reference rate. The content and AR experience access system 224, in response to determining that the rate at which the swipe gesture in the second direction is performed transgresses the reference rate, scrolls the first plurality of options together with the second plurality of options along the second direction up to a predetermined termination point that is between a first option of the first plurality of options and a first option of the second plurality of options. In some examples, the predetermined termination point corresponds to an indicator of the live video feed, the indicator being displayed within the scrollable region between the first plurality of options and the second plurality of options.

In some aspects, the content and AR experience access system 224 identifies an individual option of the first plurality of options that is currently in focus and replaces display of the live video feed in the viewfinder with display of an individual previously captured content item associated with the individual option of the first plurality of options that is currently in focus. In some aspects, the content and AR experience access system 224 modifies the configuration of the GUI in accordance with the first manner by presenting a navigation region associated with the one of the first plurality of options that is currently in focus, the navigation region including one or more options associated with an individual previously captured content item corresponding to the one of the first plurality of options that is currently in focus.

In some aspects, the one or more options include an editing option for modifying the individual previously captured content item, a category-based search option, and/or a content sharing option for sending the individual previously captured content item to one or more other users. In some aspects, the content and AR experience access system 224 receives input that selects the editing option and presents, on top of the individual previously captured content item, one or more image editing features corresponding to the editing option in response to receiving the input. In some aspects, the editing option includes a caption tool and the content and AR experience access system 224 presents a text entry region on top of the individual previously captured content item and a text attribute selection region on top of the individual previously captured content item. In some aspects, the editing option includes a graphical element option and the content and AR experience access system 224 presents a plurality of options for adding respective graphical elements on top of the individual previously captured content item.

In some examples, the content and AR experience access system 224, prior to modifying the configuration of the GUI in accordance with the first manner, presents a capture option associated with the live video feed being displayed in the GUI, wherein an image or video including the live video feed is stored in response to receiving input that selects the capture option. The content and AR experience access system 224, in response to modifying the configuration of the GUI in accordance with the first manner, removes display of the capture option.

In some examples, the content and AR experience access system 224 modifies the configuration of the GUI in accordance with the second manner by populating a capture option associated with the live video feed being displayed in the GUI with a representation of an individual AR experience corresponding to the one of the second plurality of options that is currently in focus, and presenting a navigation region associated with the one of the second plurality of options that is currently in focus. In one example, the navigation region includes one or more options associated with the individual AR experience and the one or more options include an option to modify an attribute of the individual AR experience, an option to activate the individual AR experience, and an option to save the individual AR experience.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations) and an associated virtual closet that includes one or more virtual fashion items that can be placed on the avatar. A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to generate 2D bounding boxes. The training data can include a plurality of training videos and corresponding ground truth bounding boxes. The images and videos can include a mix of all sorts of real-world objects that can appear in different real-world environments, such as different rooms in a home or household. The one or more machine learning techniques or models can be trained to extract features of a received input image or video and establish a relationship between the extracted features and a 2D bounding box of real-world objects depicted in the image or video. Once trained, the machine learning technique can receive a new image or video and can estimate a 2D bounding box for the newly received image or video.

Data Communications Architecture

Figure 4:
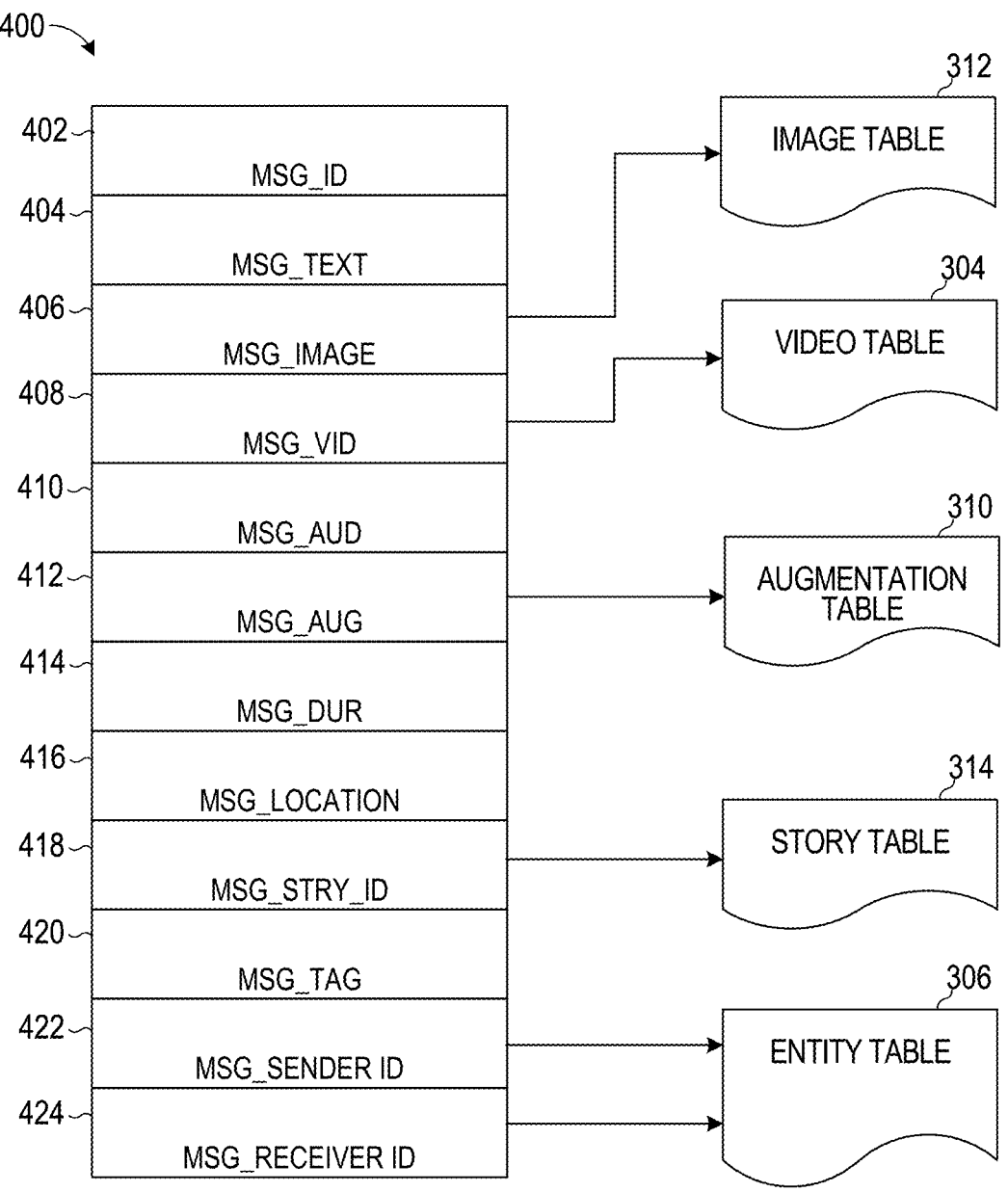
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

FIG. 5A is a flowchart illustrating example operations of the content and AR experience access system 224 in performing process 500, according to some examples. The process 500 may be embodied in computer-readable instructions for execution by one or more processors such that the operations of the process 500 may be performed in part or in whole by the functional components of the messaging server system 108; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 502, the content and AR experience access system 224 displays, by a messaging application in a viewfinder, a live video feed received from a camera of a client device, as discussed above and below.

At operation 503, the content and AR experience access system 224 presents, by the messaging application, in a scrollable region on top of the live video feed being displayed in the viewfinder, a first plurality of options associated with previously captured content items and a second plurality of options associated with AR experiences, as discussed above and below.

At operation 504, the content and AR experience access system 224 receives input associated with scrolling the scrollable region, as discussed above and below.

At operation 505, the content and AR experience access system 224, in response to receiving the input, scrolls the first plurality of options together with the second plurality of options, as discussed above and below.

FIG. 5B is a flowchart illustrating example operations of the content and AR experience access system 224 in performing process 501, according to some examples. The process 501 may be embodied in computer-readable instructions for execution by one or more processors such that the operations of the process 501 may be performed in part or in whole by the functional components of the messaging server system 108; accordingly, the process 501 is described below by way of example with reference thereto. However, in other embodiments, at least some of the operations of the process 501 may be deployed on various other hardware configurations. The process 501 is therefore not intended to be limited to the messaging server system 108 and can be implemented in whole, or in part, by any other component. Some or all of the operations of process 501 can be in parallel, out of order, or entirely omitted.

At operation 512, the content and AR experience access system 224 presents, by a messaging application, in a scrollable region on top of a live video feed being displayed in a GUI comprising a viewfinder, a first plurality of options associated with previously captured content items and a second plurality of options associated with AR experiences, as discussed above and below.

At operation 513, the content and AR experience access system 224 scrolls the first plurality of options together with the second plurality of options of the scrollable region to bring one of the first plurality of options or one of the second plurality of options into focus, as discussed above and below.

At operation 514, the content and AR experience access system 224, in response to scrolling the first plurality of options together with the second plurality of options of the scrollable region, modifies a configuration of the GUI in accordance with a first manner in response to determining that the one of the first plurality of options is currently in focus, as discussed above and below.

At operation 515, the content and AR experience access system 224, in response to scrolling the first plurality of options together with the second plurality of options of the scrollable region, modifies the configuration of the GUI in accordance with a second manner in response to determining that the one of the second plurality of options is currently in focus, as discussed above and below.

Figure 6A:
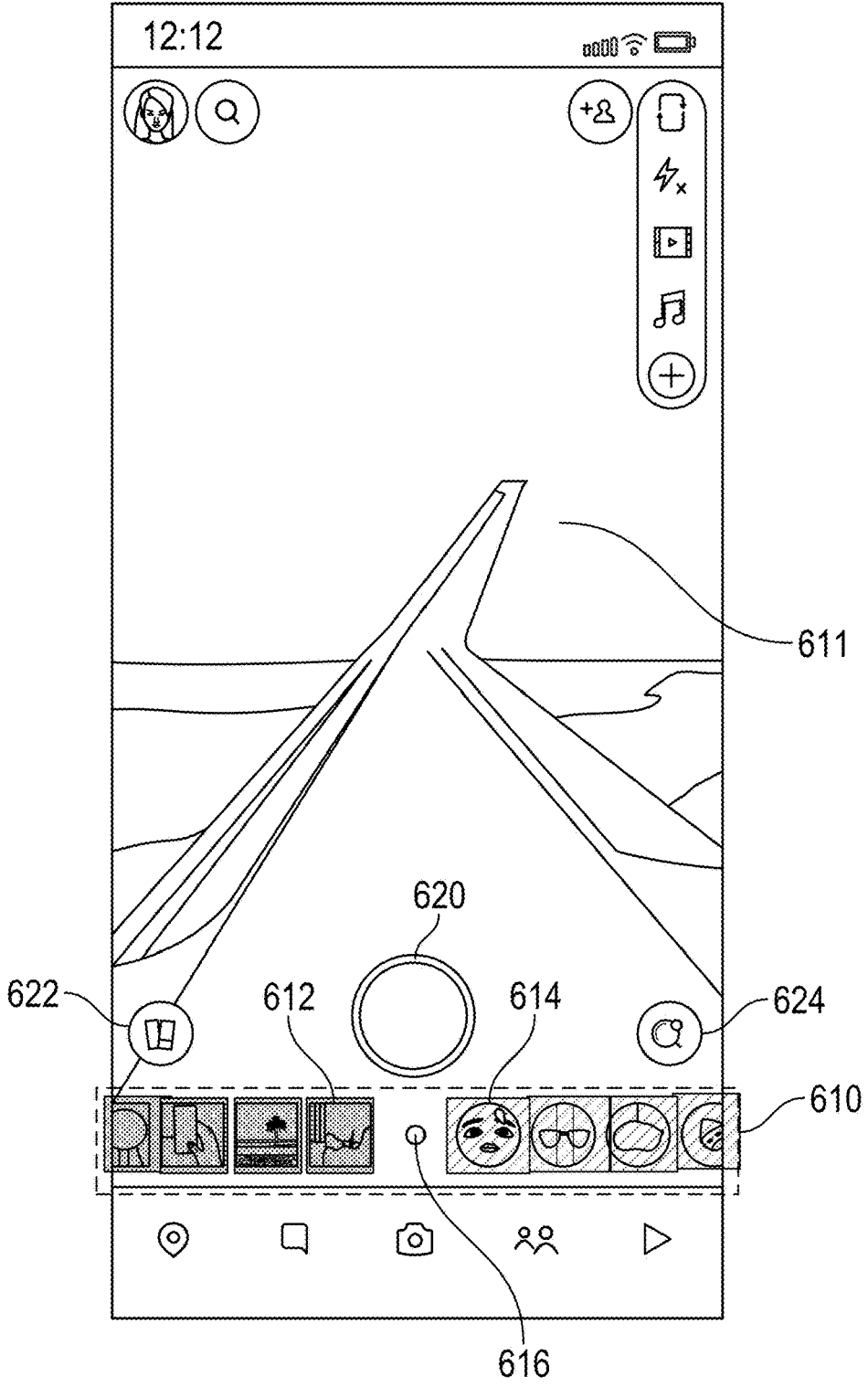
FIGS. 6A, 6B, 6C, 6D, 7, 8A and 8B are illustrative inputs and outputs of the content and AR experience access system, according to example embodiments.

FIGS. 6A, 6B, 6C, 6D, 7, 8A and 8B show illustrative inputs and outputs of the content and AR experience access system 224, according to some examples. As shown in FIG. 6A, a GUI 600 is presented on the client device 102 by the AR experience access system 224. The GUI 600 includes a viewfinder 611 that displays a real-time video feed being captured by a front-facing or rear-facing camera of the client device 102. The GUI 600 includes a capture option 620. In response to receiving a user selection of the capture option 620, the AR experience access system 224 stores an image or video corresponding to the real-time video feed. For example, if the capture option 620 is held down, a set of frames of the real-time video feed begin being captured and stored as a video until the capture option 620 is released. If the capture option 620 is tapped, then a single image shown in the viewfinder 611 is captured and stored. The video and/or images that are captured and stored form part of a set of previously captured images/videos.

In some examples, a first icon 622 is presented on the same row as the capture option 620 and a second icon 624. The first icon 622, when selected (e.g., tapped by the user), instructs the AR experience access system 224 to present a full screen GUI that is overlaid on the viewfinder 611 and includes a full list of the complete library of previously captured content items. In some cases, the first icon 622 rather than causing presentation of all the previously captured content items, causes presentation of a subset of content items meeting one or more criteria. For example, the AR experience access system 224 can present images/videos shared with one or more other users and/or that were captured and stored during a specified time interval or location in response to receiving input that selects the first icon 622. From the presented GUI of the previously captured content items, a given content item can be selected to be shared with one or more other users/friends and/or modified (edited).

In response to receiving a user selection of the second icon 624, the AR experience access system 224 presents a GUI overlaid on the viewfinder 611 that includes a search or explore interface for accessing a full list of available AR experiences or external apps. From the GUI of the AR experiences, the AR experience access system 224 can receive search parameters for accessing or identifying one or more AR experiences meeting a search criterion. A given AR experience can be selected and used to modify or augment the real-time video feed being presented in the viewfinder 611.

In some examples, the GUI 600 includes a scrollable region 610 that provides quick and easy access to a mix of content item types. For example, the scrollable region 610 provides quick and easy access to a set or subset of previously captured content items and a set or subset of AR experiences. The set or subset of the previously captured content items can be selected by retrieving or identifying a certain quantity (e.g., 25 or less) of previously captured content items from the full library of content items available in response to receiving input that selects the first icon 622. The set of previously captured content items can be formed by searching the full library of content items for content items that meet one or more criteria, such as content items of a certain type, content items captured on a certain date, time and/or location, and/or content items shared with one or more other users. The set or subset of the AR experiences can be selected by retrieving or identifying a certain quantity (e.g., 25 or less which can be the same or different quantity used for selecting the set of previously captured content items) of AR experiences from the full library of AR experiences searchable in response to receiving input that selects the second icon 624. The set of AR experiences can be formed by searching the full library of AR experiences for AR experiences that meet one or more criteria, such as content items of a certain type, content items captured on a certain date, time and/or location, and/or content items shared with one or more other users.

The scrollable region 610 represents each of the subset of the previously capture content items using a first set of icons or options 612. The first set of icons or options 612 can be presented with a first visual indicator (e.g., a geometric shape and/or color). The scrollable region 610 represents each of the subset of the AR experiences using a second set of icons or options 614. The second set of icons or options 614 can be presented with a second visual indicator (e.g., a geometric shape and/or color) that differs from the first visual indicator. The first set of icons or options 612 can be divided or separated from the second set of icons or options 614 by an indicator 616. The indicator 616 can be an option or representation of the real-time video feed being presented in the viewfinder 611. The indicator 616 can be presented with a third visual attribute (e.g., a geometric shape and/or color) that differs from the first and second visual indicators.

The AR experience access system 224 receives input associated with the scrollable region 610 to adjust or control which option is currently in focus. As shown in FIG. 6A, the indicator 616 is currently in focus as the indicator 616 is in the center of the scrollable region 610. In this case, the viewfinder 611 presents the content corresponding to the indicator 616 (e.g., the real-time video feed being received from the camera of the client device 102). The input can be a swipe gesture which is performed by detecting placement of a digit or finger of a user's hand on the area of the GUI 600 corresponding to the scrollable region 610 (where the scrollable region 610 is being presented) and detecting movement or dragging of the digit or finger in a given direction (e.g., left or right).

In response to the AR experience access system 224 detecting that the swipe gesture is being made in a first direction (e.g., the digit or finger is being dragged across the GUI 600 towards the left side), the AR experience access system 224 animates and scrolls the first and second sets of options 612 and 614 (along with the indicator 616) towards the first direction (e.g., towards the left). The speed or rate at which the icons of the scrollable region 610 are scrolled can correspond to the speed or rate at which the swipe gesture is being made. As the scrollable region 610 is being scrolled towards the left, different ones of the options 614 corresponding to different AR experiences are brought into focus (e.g., enter the focus region or center region of the scrollable region 610).

Figure 6B:
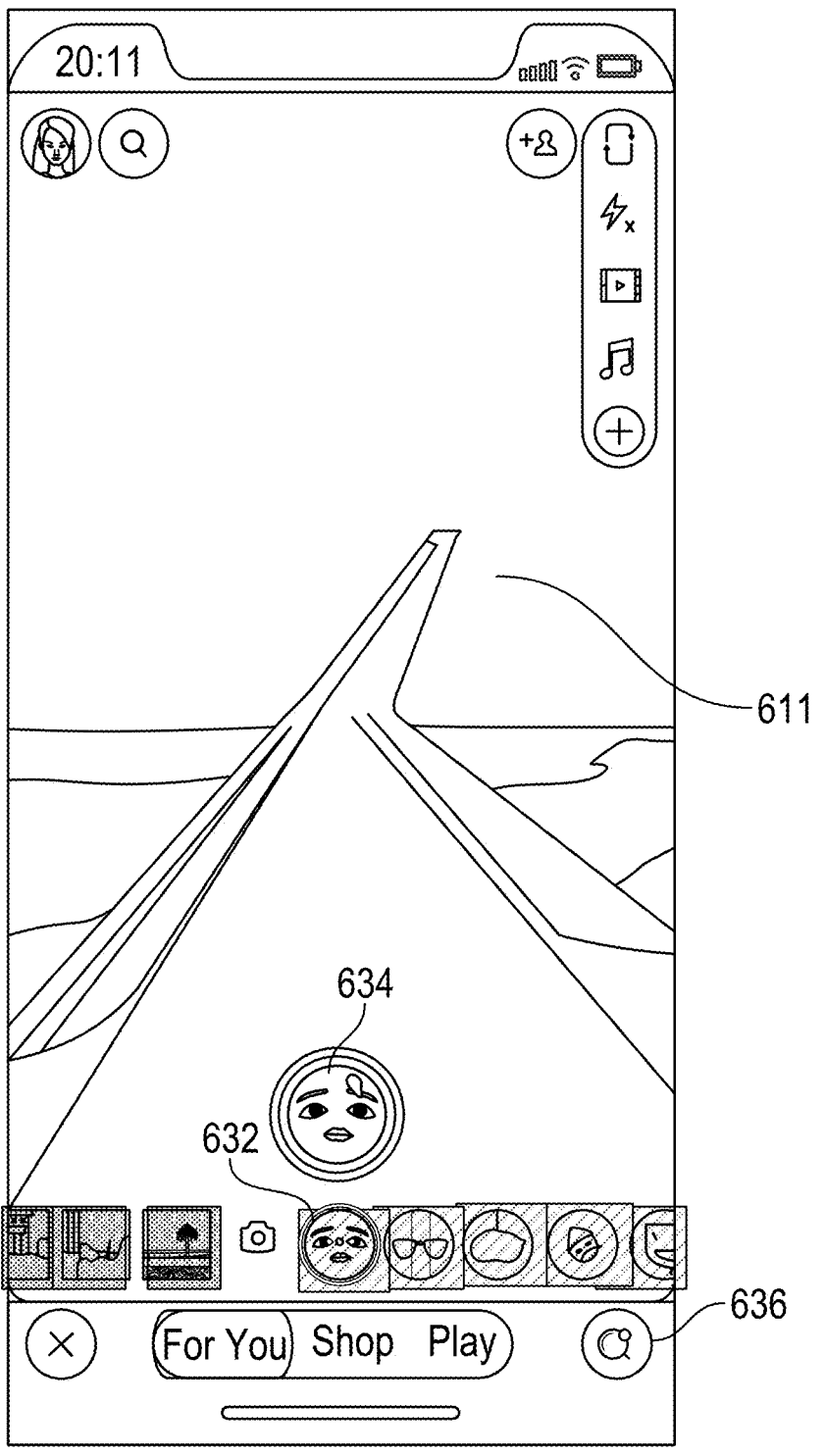

For example, as shown in the GUI 601 of FIG. 6B, the viewfinder 611 has been scrolled to the left side based on a swipe gesture being made in the first direction. A given option 632 of the options 614 corresponding to a given AR experience has been brought into focus. The given option 632 of the options 614 that is in focus is illustrated by a white border being placed around the option 632. The capture option 620 is updated to reflect the AR experience corresponding to the given option 632 that is in focus. For example, a visual representation 634 populates or fills in the capture option 620 to represent or identify the AR experience corresponding to the given option 632 that is in focus.

In some examples, the AR experience access system 224 also presents a navigation bar or menu 636 in response to determining that the given option 632 that is in focus corresponds to an AR experience. The menu 636 can include one or more options or features associated with AR experiences, such as a recommendation option, a shop option, a play option, a save option, a close option, and a search option. The recommendation option when selected provides additional AR experiences to the user for selection and activation. The shop option provides the user a list of other available AR experience that the user can purchase and activate. The play option allows the user to instruct the AR experience access system 224 to launch the AR experience corresponding to the visual representation 634 by modifying the real-time video feed presented in the viewfinder 611 using the AR elements of the AR experience. The save option allows the user to save the AR experience corresponding to the visual representation 634 in a separate library of saved AR experiences. The search option presented in the menu 636 can perform the same or similar functions as the second icon 624 when selected. Other menu options can be presented in another region on top of the viewfinder 611, such as options to add music to the real-time video feed, perform a replay, capture a short clip and so forth.

In some cases, in response to detecting that a swipe gesture is being made in the second direction (e.g., the digit or finger is being dragged across the GUI 601 towards the right side), the AR experience access system 224 animates and scrolls the first and second sets of options 612 and 614 (along with the indicator 616) towards the second direction (e.g., towards the right). Namely, the AR experience access system 224 can receive input that includes a swipe gesture to scroll the scrollable region 610 towards the options 614 when one of the options 614 is in focus. The speed or rate at which the gesture is performed can be measured and compared to a reference or threshold. If the speed or rate at which the gesture is performed transgresses the reference or threshold, the AR experience access system 224 scrolls the options 612 and the options 614 along the second direction of the swipe gesture at the speed or rate of the gesture but the AR experience access system 224 automatically stops scrolling the options 612 and the options 614 at a specified point, such as the indicator 616. In this case, the AR experience access system 224 automatically presents the real-time video feed in the viewfinder 611 when the scrollable region 610 is automatically stopped being scrolled. The AR experience access system 224 can receive additional input including an additional swipe gesture in the second direction to start bringing the options 612 into focus.

Figure 6C:
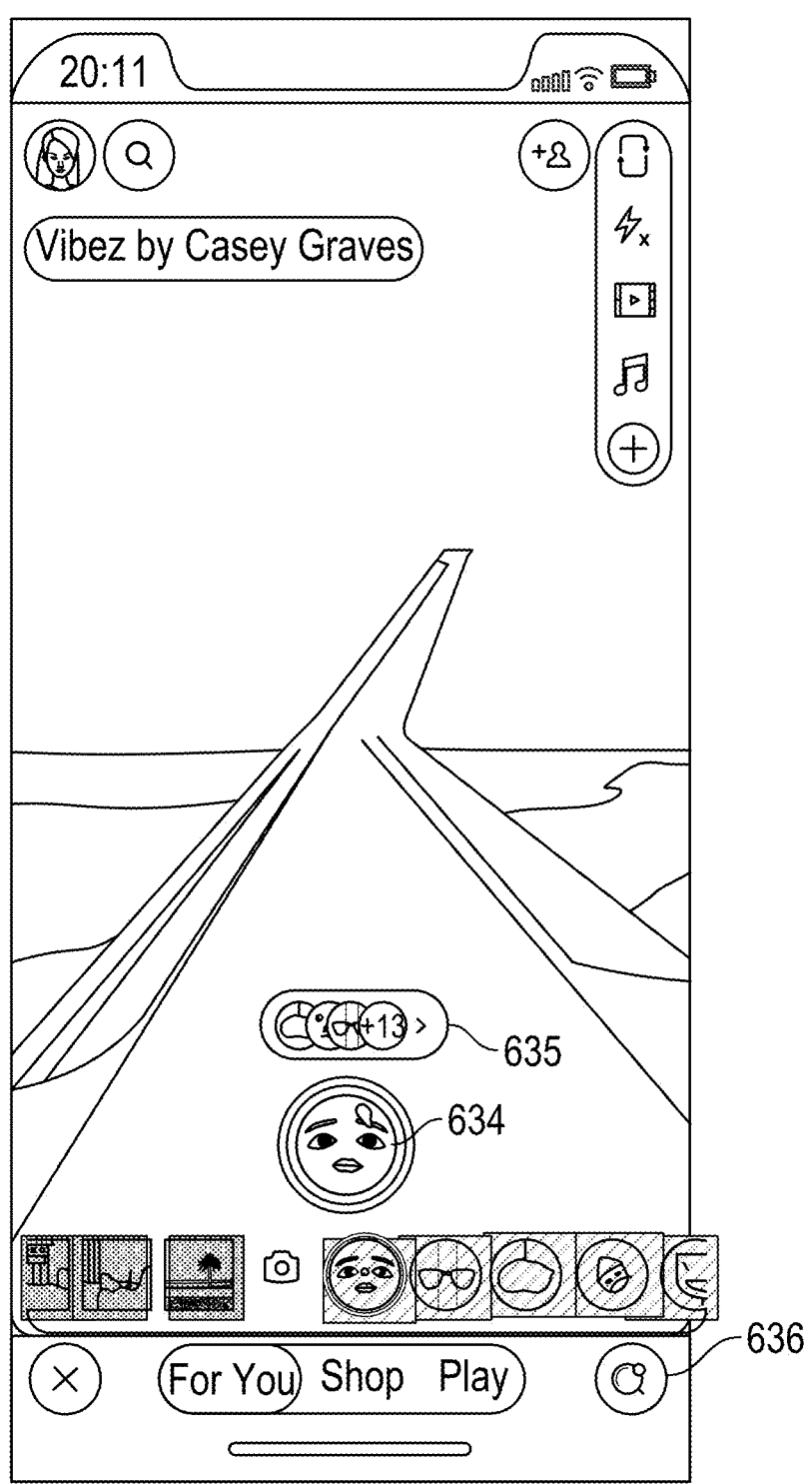

In some examples, as shown in the GUI 603 of FIG. 6C, the AR experience access system 224 also presents a contextually related AR experiences 635 in response to determining that the given option 632 that is in focus corresponds to an AR experience and in response to receiving a user selection of the visual representation 634. The contextually related AR experiences 635 can include one or more options or features corresponding to related AR experiences, such as AR experiences by the same developer as the AR experience associated with the visual representation 634 and/or having similar content as the AR experience associated with the visual representation 634. The AR experience access system 224 can receive input that selects one of the AR experiences from the contextually related AR experiences 635 and can automatically launch the selected AR experience to augment the real-time video feed in the viewfinder 611 with corresponding AR objects. The contextually related AR experiences 635 can be presented as small icons above the visual representation 634, as shown in GUI 603.

Figure 6D:
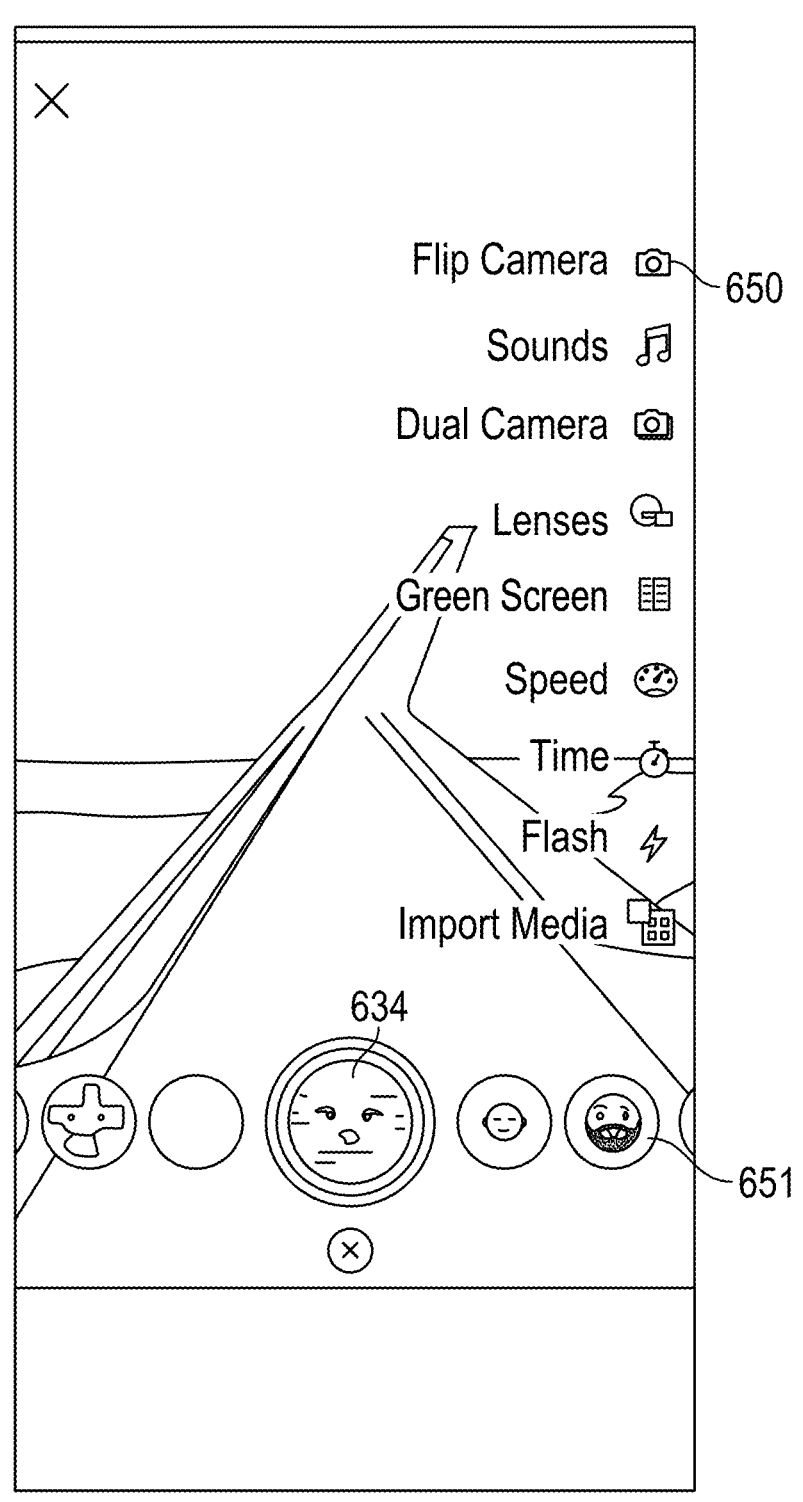

In some cases, the contextually related AR experiences 635 can be presented on the same row as the visual representation 634 as shown in the GUI 604 of FIG. 6D. For example, the GUI 604 presents the visual representation 634 corresponding to the AR experience that has been navigated to in the scrollable region 610 and brought to focus. The GUI 604 presents in the same row as visual representation 634 a set of related AR experiences 651. The AR experience access system 224 can receive input that swipes left/right along the row of the related AR experiences 651 to bring a different representation of one of the related AR experiences 651 into focus in place of the visual representation 634. The AR experience access system 224 can also present a set of options 650 for adjusting parameters of the AR experience associated with the visual representation 634 that is in focus.

The set of options 650 can include a camera control option for switching between a front-facing and rear-facing camera from which to receive the real-time video feed, a dual camera activation option to active both the front-facing and rear-facing cameras of the client device 102, a timer option for activating a timer for starting/stopping recording of a video corresponding to the real-time video feed, an import media option to add media to an AR experience used to augment the real-time video feed, and so forth.

Referring back to FIG. 6A, in response to detecting that the swipe gesture is being made in a second direction (e.g., the digit or finger is being dragged across the GUI 600 towards the right side), the AR experience access system 224 animates and scrolls the first and second sets of options 612 and 614 (along with the indicator 616) towards the second direction (e.g., towards the right). The speed or rate at which the icons of the scrollable region 610 are scrolled can correspond to the speed or rate at which the swipe gesture is being made. As the scrollable region 610 is being scrolled towards the right, different ones of the options 612 corresponding to different previously captured content items are brought into focus (e.g., enter the focus region or center region of the scrollable region 610). As each one of the options 612 enters the focus region, the AR experience access system 224 retrieves the corresponding previously captured content item and replaces presentation of the real-time video feed in the viewfinder 611 with the retrieved previously captured content item. Different previously captured content items can be stored in different aspect ratios. The viewfinder 611 presents the previously captured content items in accordance with their respective aspect ratios. Specifically, when a first of the options 612 is brought into focus and corresponds to a first previously captured content item that was captured with a first aspect ratio, the viewfinder 611 is updated to display the first previously captured content item in the first aspect ratio. As the scrollable region 610 continues to be scrolled in the same direction an adjacent second of the options 612 is brought into focus. A second previously captured content items captured with a second aspect ratio and corresponding to the second of the options 612 currently in focus is presented in the viewfinder 611 in the second aspect ratio.

Figure 7:
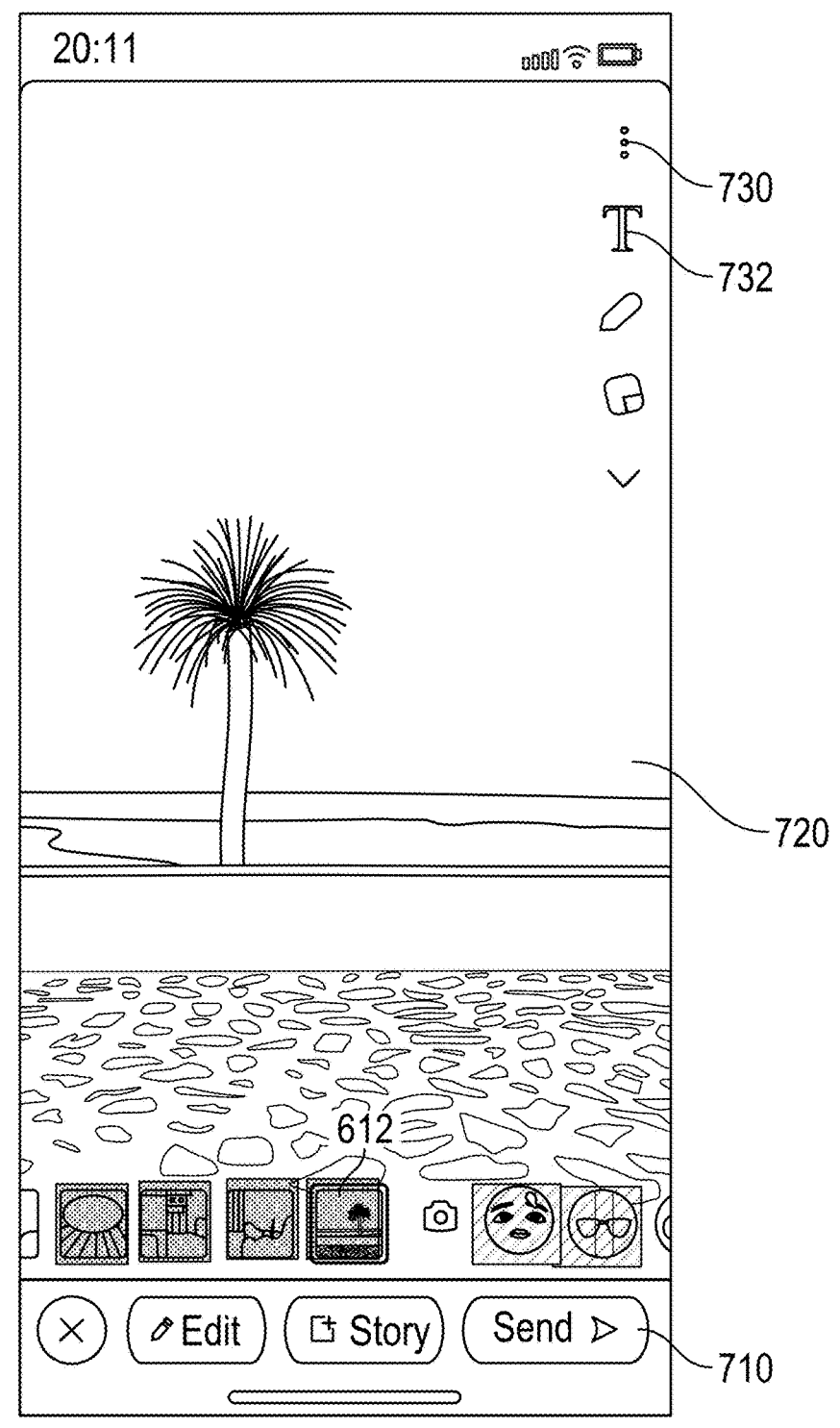
Figure 8A:
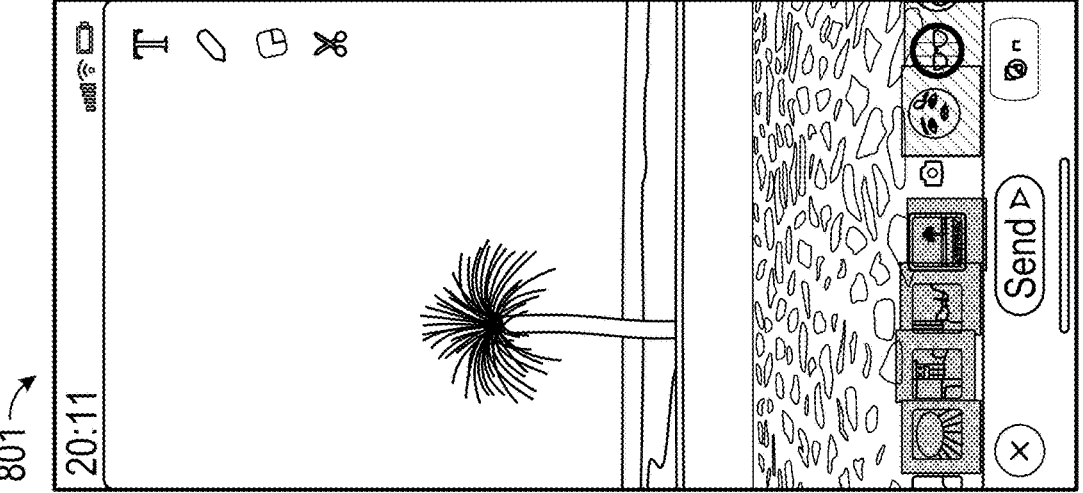
Figure 8B:
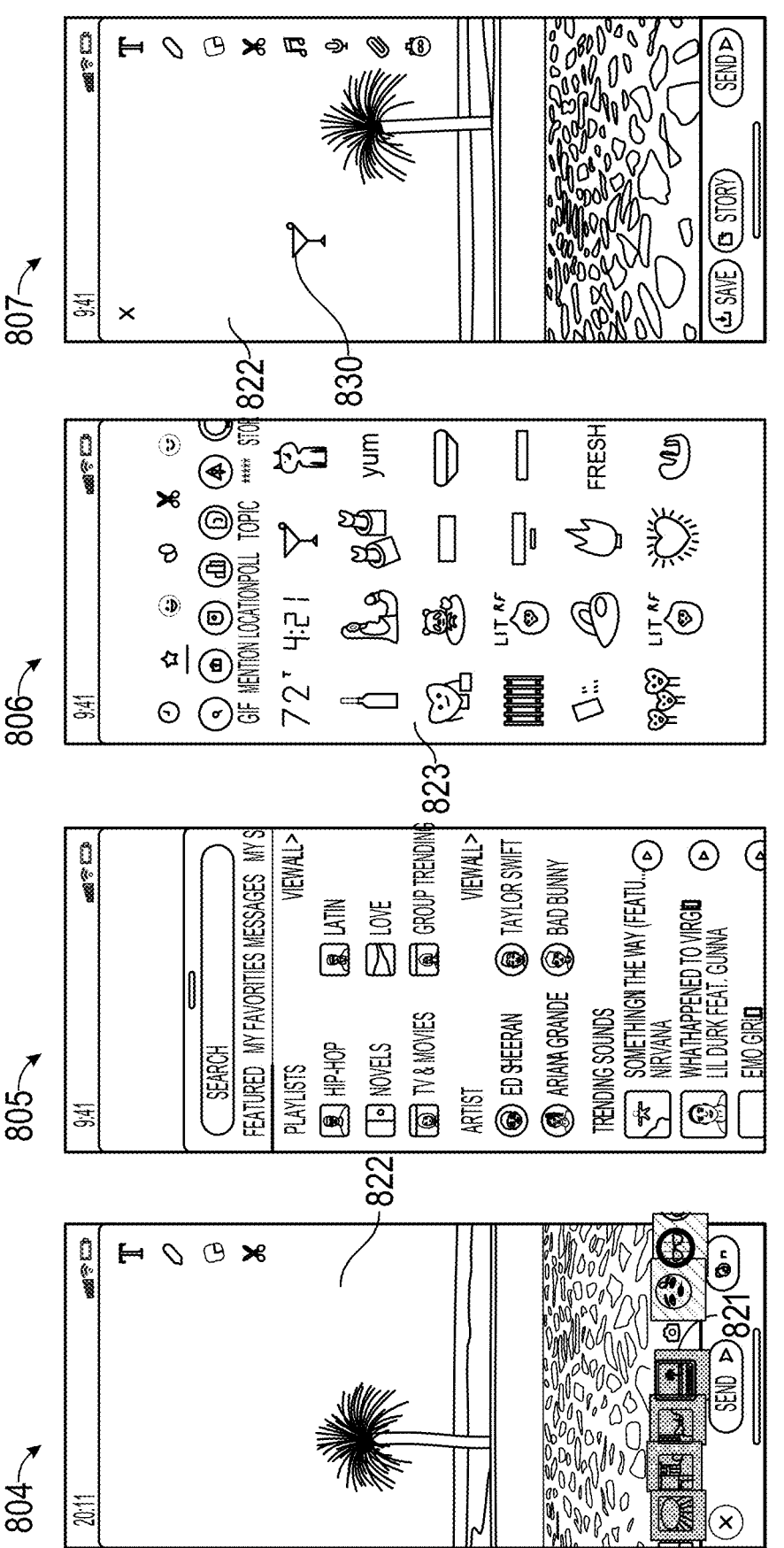

For example, as shown in the GUI 700 of FIG. 7, the viewfinder 611 has been scrolled to the right and a given one of the options 612 corresponding to a previously captured content items has been brought into focus. The current option 612 that is in focus is illustrated by a white border being placed around the option 612. The viewfinder 611 is updated to present the previously captured content item 720. The AR experience access system 224 can present a navigation menu 710 with one or more options related to the previously captured content item 720 corresponding to the option that is currently in focus.

The options in the navigation menu 710 can include an edit option, a story option, and a send option. The edit option, when selected, instructs the AR experience access system 224 to present an editing interface for modifying one or more attributes of the previously captured content item 720. For example, in response to receiving selection of the edit option, a set of editing features 730 can be presented. In some cases, the set of editing features 730 can be presented even if the edit option is not selected and in response to the AR experience access system 224 determining that the option currently in focus in the scrollable region 610 corresponds to the previously captured content item 720. In some examples, in response to determining that the option currently in focus in the scrollable region 610 corresponds to the previously captured content item 720, the AR experience access system 224 removes from display the capture option 620. This is because the capture option 620 cannot be used to perform any function when the viewfinder 611 is presented previously captured content. On the other hand, when the AR experience access system 224 determines that the option currently in focus in the scrollable region 610 corresponds to an AR experience, the capture option 620 remains displayed to enable application of the AR experience to the real-time video feed that may be captured.

In response to receiving selection of the story option, the AR experience access system 224 can automatically send or share the previously captured content item 720 with various friends or preselected friends of the user on the messaging client 104. In response to receiving selection of the send option, the AR experience access system 224 can present a user interface for the user to select one or more designated recipients to which to send the previously captured content item 720.

In some examples, the editing features 730 include a caption entry feature 732. In response to receiving input that selects the caption entry feature 732, the AR experience access system 224 presents a set of GUIs 801, 802, and 803 shown in FIG. 8A. Specifically, GUI 801 presents the previously captured content item 720 similar to the GUI 700. The navigation menu 710 in this case only includes a send option. The AR experience access system 224 can receive input that selects the caption entry feature 732 from the GUI 801. In response, the AR experience access system 224 presents GUI 802. In GUI 802, a text entry region is presented along with and on top of the previously captured content item 720. Also, the caption entry feature 732 is displayed on top of the previously captured content item 720 without any of the non-selected editing features. Additional editing features for the caption entry are presented, such as in a slider, to control the textual attributes of the caption entered corresponding to the text input in the text entry region.

Once the user adds the desired text in the text entry region with the corresponding textual attributes, the AR experience access system 224 presents GUI 803 that allows the user to specify a location within the previously captured content item 720 on which to present the caption corresponding to the text of the text entry region. The GUI 803 now includes additional options for adding to a story, saving the modified previously captured content item 720 with the caption, and/or sending the modified previously captured content item 720 to one or more designated recipients. In this way, a user can quickly and easily select a desired previously captured content item from the scrollable region 610 and within the same GUI edit the desired content item. This can all be done without having to navigate to a separate content editing interface and selecting the desired content to edit from within that particular interface. In this way, the efficiency of the overall system is improved and number of pages of information that need to be searched and navigated through to perform content editing is reduced.

In some examples, the editing features 730 include a sticker or graphical element feature. In response to receiving input that selects the sticker or graphical element feature, the AR experience access system 224 presents a set of GUIs 804, 805, 806, and 807 shown in FIG. 8B. Specifically, GUI 804 presents the previously captured content item 822 (e.g., the content item 720) similar to the GUI 700. The previously captured content item 822 corresponds to the icon 821 in the scrollable region 610 that is currently in focus. The AR experience access system 224 can receive input that selects the sticker or graphical element feature from the GUI 804. In response, the AR experience access system 224 presents GUI 805. In GUI 805, a set of graphical elements or stickers is presented along with and on top of the previously captured content item 822. The GUI 805 includes a search input region allowing the user to input a search string to identify one or more matching stickers or graphical elements. For example, GUI 806 can present a set of matching stickers or graphical elements 823.

Once the user selects a particular sticker or graphical element from the set of matching stickers or graphical elements 823, the AR experience access system 224 presents GUI 807 that allows the user to specify a location within the previously captured content item 822 on which to place the selected sticker or graphical element. For example, the AR experience access system 224 can receive input that specifies a location 830 on which to add the selected graphical element to the previously captured content item 822. The AR experience access system 224 places and modifies the previously captured content item 822 to include the selected graphical element in the specified location.

The GUI 807 includes options for adding to a story, saving the modified previously captured content item 822 with the caption, and/or sending the modified previously captured content item 822 to one or more designated recipients. In this way, a user can quickly and easily select a desired previously captured content item from the scrollable region 610 and within the same GUI edit the desired content item. This can all be done without having to navigate to a separate content editing interface and selecting the desired content to edit from within that particular interface. In this way, the efficiency of the overall system is improved and number of pages of information that need to be searched and navigated through to perform content editing is reduced.

Referring back to FIG. 7, in response to detecting that a swipe gesture is being made in the first direction (e.g., the digit or finger is being dragged across the GUI 600 towards the left side), the AR experience access system 224 animates and scrolls the first and second sets of options 612 and 614 (along with the indicator 616) towards the first direction (e.g., towards the left). Namely, the AR experience access system 224 can receive input that includes a swipe gesture to scroll the scrollable region 610 towards the options 614 when one of the options 612 is in focus. The speed or rate at which the gesture is performed can be measured and compared to a reference or threshold. If the speed or rate at which the gesture is performed transgresses the reference or threshold, the AR experience access system 224 scrolls the options 612 and the options 614 along the first direction of the swipe gesture at the speed or rate of the gesture but the AR experience access system 224 automatically stops scrolling the options 612 and the options 614 at a specified point, such as the indicator 616. In this case, the AR experience access system 224 automatically presents the real-time video feed in the viewfinder 611 when the scrollable region 610 is automatically stopped being scrolled. The AR experience access system 224 can receive additional input including an additional swipe gesture in the first direction to start bringing the options 614 into focus.

Machine Architecture

Figure 9:
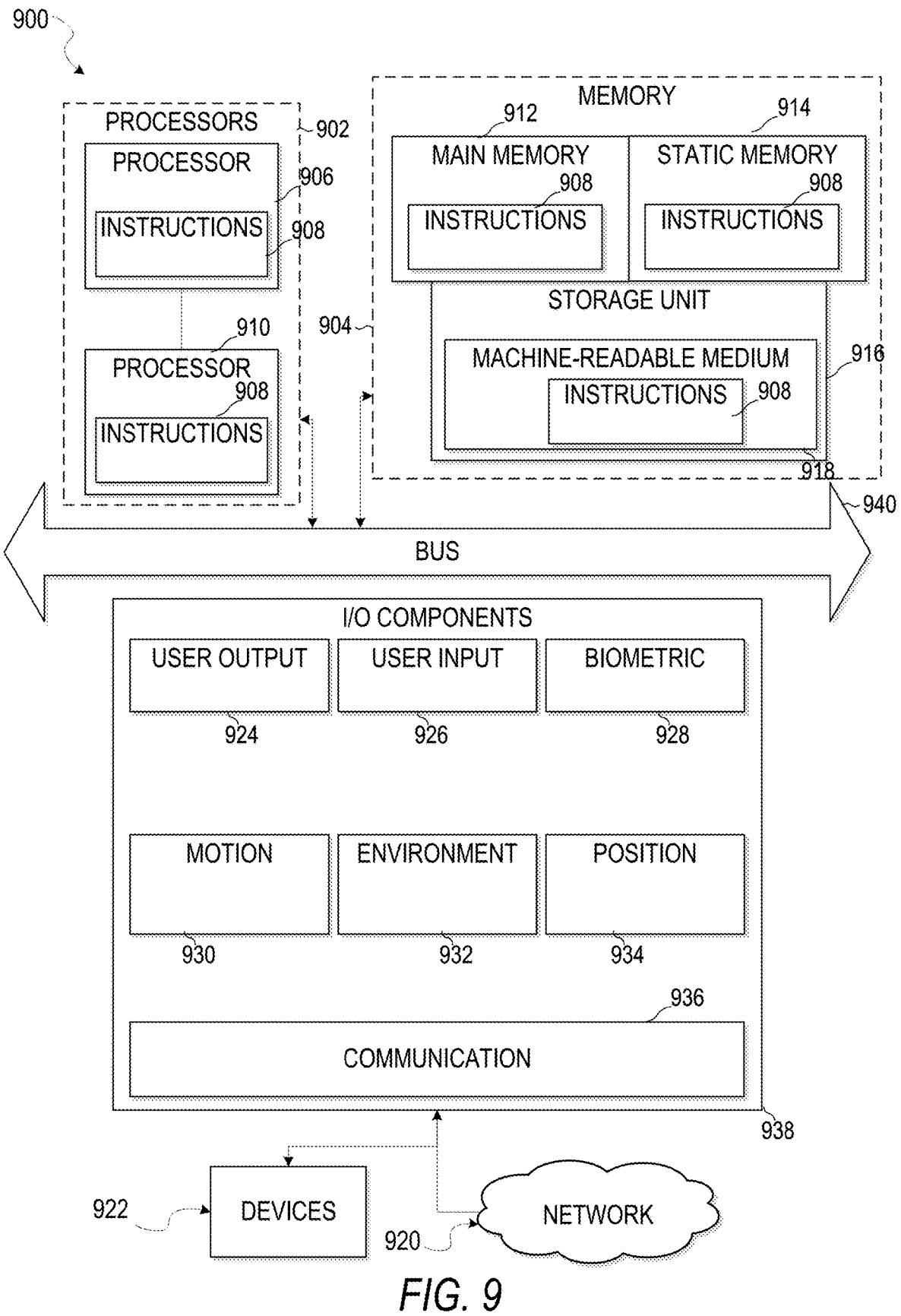
FIG. 9 is a block diagram illustrating a representative software architecture, which may be used in conjunction with various hardware architectures herein described, according to example embodiments.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
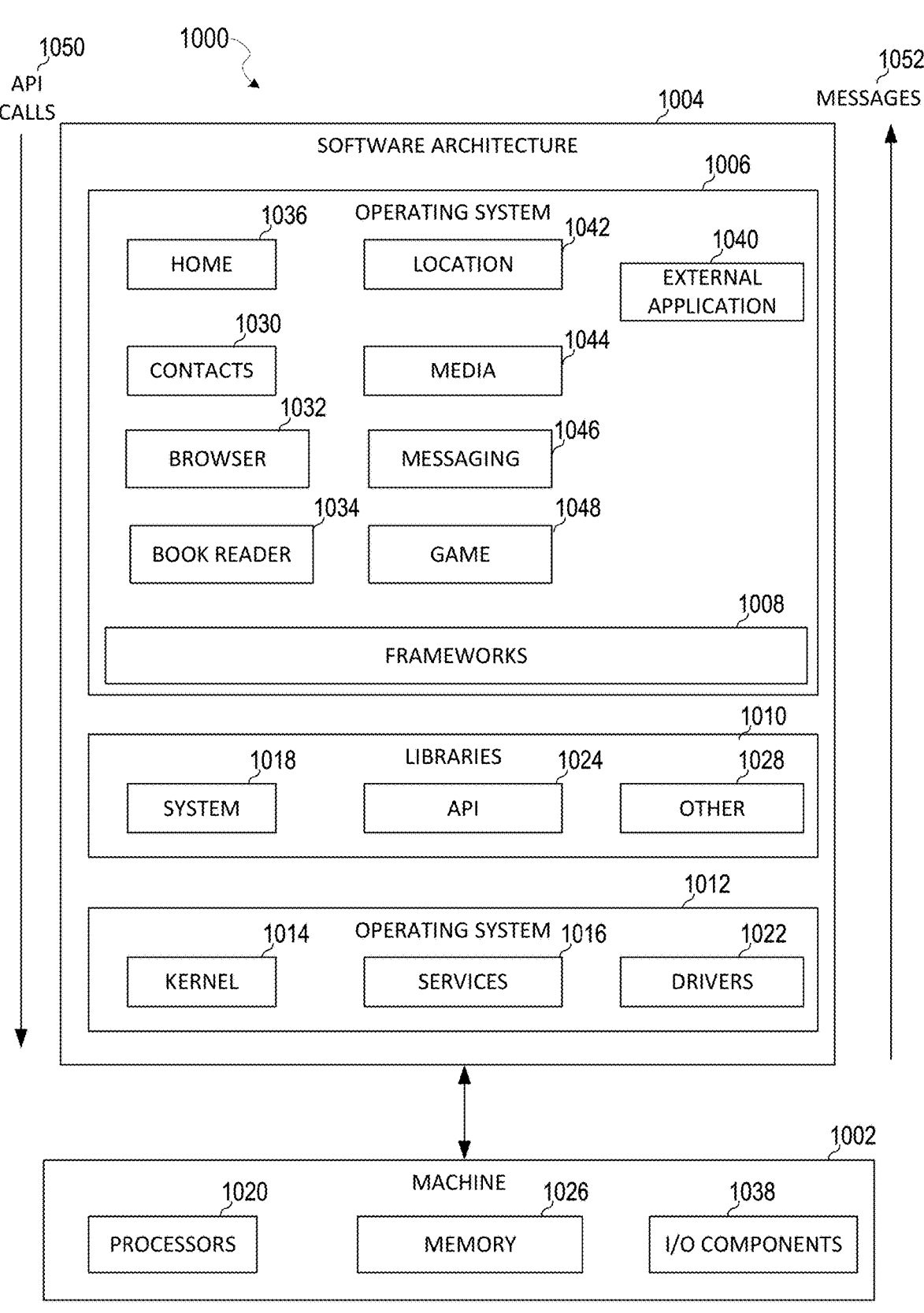
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components.

Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

presenting, by a messaging application, in a scrollable region on top of a live video feed being displayed in a graphical user interface (GUI), a first plurality of options associated with previously captured content items and a second plurality of options associated with augmented reality (AR) experiences, the first plurality of options presented in line with the second plurality of options, the first plurality of options presented in a first direction, and the second plurality of options presented in a second direction opposite the first direction;

presenting, in proximity to the scrollable region, a first icon, a capture icon, and a second icon, the first icon causes presentation of a full screen display that includes a list of previously captured content items when selected, the capture icon causes performance of a first function comprising storage of an image corresponding to the live video feed, and the second icon causes presentation of an expanded display of available AR experiences when selected;

in response to scrolling the first plurality of options together with the second plurality of options of the scrollable region to bring a first option of the first plurality of options or a second option of the second plurality of options into focus:

modifying a configuration of the GUI in accordance with a first manner in response to determining that the first option is currently in focus;

modifying the configuration of the GUI in accordance with a second manner in response to determining that the second option is currently in focus, the modifying the configuration of the GUI in accordance with the second manner comprising:

updating the capture icon to an alternate function icon with visual elements to represent the AR experience for a second function involving the AR experience; and in response to a selection of the capture icon, presenting a set of contextually related AR experiences associated with the AR experience in proximity to the capture icon; and modifying the capture icon to perform a second function, different from the first function, in response to determining that the second option of the second plurality of options is currently in focus, the second function comprising enabling application of the AR experience to the live video feed; and in response to a selection of the set of contextually related AR experiences while the live video feed is being displayed in the GUI, replacing the first plurality of options and the second plurality of options in the scrollable region with the set of contextually related AR experiences.

2. The method of claim 1, further comprising:

presenting an indicator of the live video feed within the scrollable region between the first plurality of options and the second plurality of options, the modifying the configuration of the GUI in accordance with the first manner comprising removing presentation of the capture icon in response to determining that the first option of the first plurality of options associated with a previously captured content item is currently in focus.

3. The method of claim 1, wherein each of the first plurality of options is represented by a first type of visual indicator, and wherein each of the second plurality of options is represented by a second type of visual indicator.

4. The method of claim 1, wherein modifying the configuration of the GUI in accordance with the second manner further comprises:

identifying the set of contextually related AR experiences based on a developer of the AR experience, the set of contextually related AR experiences associated with the developer of the AR experience.

5. The method of claim 1, wherein the previously captured content items associated with the first plurality of options correspond to a subset of a plurality of content items previously stored by a user device, and further comprising:

presenting an option for accessing the plurality of content items on top of the live video feed being displayed in the GUI and separately from the scrollable region.

6. The method of claim 5, further comprising:

selecting the subset of the plurality of content items from the plurality of content items previously stored by the user device based on one or more criteria, the one or more criteria comprising time associated with each of the subset of the plurality of content items, location associated with each of the subset of the plurality of content items, and content item type associated with each of the subset of the plurality of content items.

7. The method of claim 1, wherein the AR experiences associated with the second plurality of options correspond to a subset of a plurality of AR experiences available on the messaging application, and further comprising:

presenting an option for searching the subset of the plurality of AR experiences on top of the live video feed being displayed in the GUI and separately from the scrollable region.

8. The method of claim 7, wherein the option for searching the subset of the plurality of AR experiences comprises a first option, and further comprising presenting a second option for accessing a plurality of content items on top of the live video feed being displayed in the GUI and separately from the scrollable region.

9. The method of claim 1, further comprising:

receiving input comprising a swipe gesture in a given direction, wherein the first plurality of options are scrolled together with the second plurality of options along the given direction in response to the swipe gesture.

10. The method of claim 9, further comprising:

identifying an individual option of the first plurality of options that is currently in focus; and replacing display of the live video feed with display of an individual previously captured content item associated with the individual option of the first plurality of options that is currently in focus.

11. The method of claim 1, further comprising:

receiving a swipe gesture in a given direction;

determining that a rate at which the swipe gesture in the given direction is performed transgresses a reference rate; and in response to determining that the rate at which the swipe gesture in the given direction is performed transgresses the reference rate, scrolling the first plurality of options together with the second plurality of options along the given direction up to a predetermined termination point that is between a first option of the first plurality of options and a second option of the second plurality of options.

12. The method of claim 11, wherein predetermined termination point corresponds to an indicator of the live video feed, the indicator being displayed within the scrollable region between the first plurality of options and the second plurality of options.

13. The method of claim 1, wherein modifying the configuration of the GUI in accordance with the first manner further comprises:

presenting a navigation region associated with the first option of the first plurality of options that is currently in focus, the navigation region comprising one or more options associated with an individual previously captured content item corresponding to the first option of the first plurality of options that is currently in focus.

14. The method of claim 13, wherein the one or more options comprise an editing option for modifying the individual previously captured content item, a category-based search option, and a content sharing option for sending the individual previously captured content item to one or more other users.

15. The method of claim 14, further comprising:

receiving input that selects the editing option; and presenting, on top of the individual previously captured content item, one or more image editing features corresponding to the editing option in response to receiving the input.

16. The method of claim 15, wherein the editing option comprises a caption tool, and further comprising presenting a text entry region on top of the individual previously captured content item and a text attribute selection region on top of the individual previously captured content item, and wherein the editing option comprises a graphical element option, further comprising presenting a plurality of options for adding respective graphical elements on top of the individual previously captured content item.

17. The method of claim 13, further comprising:

prior to modifying the configuration of the GUI in accordance with the first manner, presenting a capture option associated with the live video feed being displayed in the GUI, wherein an image or video comprising the live video feed is stored in response to receiving input that selects the capture option; and in response to modifying the configuration of the GUI in accordance with the first manner, removing display of the capture option.

18. The method of claim 1, wherein modifying the configuration of the GUI in accordance with the second manner further comprises:

presenting a navigation region associated with the second option of the second plurality of options that is currently in focus, the navigation region comprising one or more options associated with an individual AR experience, the one or more options comprising an option to modify an attribute of the individual AR experience, an option to activate the individual AR experience, and an option to save the individual AR experience.

19. A system comprising:

at least one processor configured to perform operations comprising:

presenting, by a messaging application, in a scrollable region on top of a live video feed being displayed in a graphical user interface (GUI), a first plurality of options associated with previously captured content items and a second plurality of options associated with augmented reality (AR) experiences, the first plurality of options presented in line with the second plurality of options, the first plurality of options presented in a first direction, and the second plurality of options presented in a second direction opposite the first direction;

presenting, in proximity to the scrollable region, a first icon, a capture icon, and a second icon, the first icon causes presentation of a full screen display that includes a list of previously captured content items when selected, the capture icon causes performance of a first function comprising storage of an image corresponding to the live video feed, and the second icon causes presentation of an expanded display of available AR experiences when selected;

in response to scrolling the first plurality of options together with the second plurality of options of the scrollable region to bring a first option of the first plurality of options or a second option of the second plurality of options into focus:

modifying a configuration of the GUI in accordance with a first manner in response to determining that the first option is currently in focus;

modifying the configuration of the GUI in accordance with a second manner in response to determining that the second option is currently in focus, the modifying the configuration of the GUI in accordance with the second manner comprising:

updating the capture icon to an alternate function icon with visual elements to represent the AR experience for a second function involving the AR experience; and in response to a selection of the capture icon, presenting a set of contextually related AR experiences associated with the AR experience in proximity to the capture icon; and modifying the capture icon to perform a second function, different from the first function, in response to determining that the second option of the second plurality of options is currently in focus, the second function comprising enabling application of the AR experience to the live video feed; and in response to a selection of the set of contextually related AR experiences while the live video feed is being displayed in the GUI, replacing the first plurality of options and the second plurality of options in the scrollable region with the set of contextually related AR experiences.

20. A non-transitory machine-readable storage medium that includes instructions that, when executed by one or more processors of a machine, cause the machine to perform operations comprising:

presenting, by a messaging application, in a scrollable region on top of a live video feed being displayed in a graphical user interface (GUI), a first plurality of options associated with previously captured content items and a second plurality of options associated with augmented reality (AR) experiences, the first plurality of options presented in line with the second plurality of options, the first plurality of options presented in a first direction, and the second plurality of options presented in a second direction opposite the first direction;

presenting, in proximity to the scrollable region, a first icon, a capture icon, and a second icon, the first icon causes presentation of a full screen display that includes a list of previously captured content items when selected, the capture icon causes performance of a first function comprising storage of an image corresponding to the live video feed, and the second icon causes presentation of an expanded display of available AR experiences when selected;

in response to scrolling the first plurality of options together with the second plurality of options of the scrollable region to bring a first option of the first plurality of options or a second option of the second plurality of options into focus:

modifying a configuration of the GUI in accordance with a first manner in response to determining that the first option is currently in focus;

modifying the configuration of the GUI in accordance with a second manner in response to determining that the second option is currently in focus, the modifying the configuration of the GUI in accordance with the second manner comprising:

updating the capture icon to an alternate function icon with visual elements to represent the AR experience for a second function involving the AR experience; and in response to a selection of the capture icon, presenting a set of contextually related AR experiences associated with the AR experience in proximity to the capture icon; and modifying the capture icon to perform a second function, different from the first function, in response to determining that the second option of the second plurality of options is currently in focus, the second function comprising enabling application of the AR experience to the live video feed; and in response to a selection of the set of contextually related AR experiences while the live video feed is being displayed in the GUI, replacing the first plurality of options and the second plurality of options in the scrollable region with the set of contextually related AR experiences.

* * * * *